US009598639B2

(12) United States Patent
Lee et al.

(10) Patent No.: US 9,598,639 B2
(45) Date of Patent: Mar. 21, 2017

(54) LIQUID-CRYSTAL COMPOUND, LIQUID-CRYSTAL COMPOSITION AND LIQUID-CRYSTAL DISPLAY DEVICE

(71) Applicant: DAXIN MATERIALS CORPORATION, Taichung (TW)

(72) Inventors: Ching-Tien Lee, Taichung (TW); Hsin-Cheng Liu, Taichung (TW); Chun-Chih Wang, Taichung (TW); Wan-Yu Huang, Taichung (TW); Tian-Meng Jiang, Taichung (TW); Hui-Qiang Tian, Taichung (TW); Li-Long Gao, Taichung (TW)

(73) Assignee: DAXIN MATERIALS CORPORATION, Taichung (TW)

( * ) Notice: Subject to any disclaimer, the term of this patent is extended or adjusted under 35 U.S.C. 154(b) by 0 days.

(21) Appl. No.: 14/806,153

(22) Filed: Jul. 22, 2015

(65) Prior Publication Data

US 2016/0024384 A1 Jan. 28, 2016

(30) Foreign Application Priority Data

Jul. 23, 2014 (CN) .......................... 2014 1 0352442
May 11, 2015 (TW) .............................. 104114861 A

(51) Int. Cl.
| | | |
|---|---|---|
| G02F 1/1333 | (2006.01) | |
| C09K 19/32 | (2006.01) | |
| C09K 19/34 | (2006.01) | |
| C09K 19/04 | (2006.01) | |

(52) U.S. Cl.
CPC ...... C09K 19/32 (2013.01); *C09K 2019/0466* (2013.01); *C09K 2019/3425* (2013.01); *C09K 2019/3427* (2013.01)

(58) Field of Classification Search
CPC ............ C09K 19/32; C09K 2019/3425; C09K 2019/3427; C09K 2019/0466; G02F 1/1333
USPC ............. 252/299.01, 299.6, 299.61; 428/1.1; 349/182
See application file for complete search history.

(56) References Cited

U.S. PATENT DOCUMENTS 8,609,208 B2* 12/2013 Yamamoto ......... C09K 19/0275
252/299.5
2013/0114009 A1 5/2013 Yamamoto et al.

FOREIGN PATENT DOCUMENTS

| CN | 102757793 | 10/2012 | |
|---|---|---|---|
| JP | 2013-1683 | * 1/2013 | ............. C09K 19/34 |

OTHER PUBLICATIONS

Office Action mailed on Aug. 14, 2015 for corresponding Taiwanese application No. 104114861, 5 pages.

* cited by examiner

*Primary Examiner* — Geraldina Visconti
(74) *Attorney, Agent, or Firm* — Muncy, Geissler, Olds & Lowe, P.C.

(57) ABSTRACT

Liquid-crystal compounds, liquid-crystal compositions, and liquid-crystal devices employing the same are provided. The liquid-crystal compound has a structure of Formula (I):

Formula (I)

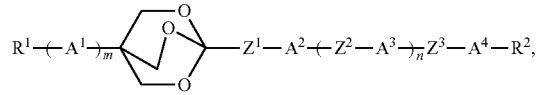

wherein $R^1$ is hydrogen, $C_{1-10}$ alkyl, or $C_{2-10}$ alkenyl; $R^2$ is, $C_{2-10}$ alkenyl, or $C_{2-10}$ fluoroalkenyl, in which one or two nonadjacent —$CH_2$— is replaced by —O—, or $C_{2-10}$ ether; $A^1$, $A^2$, $A^3$, and $A^4$ are independently

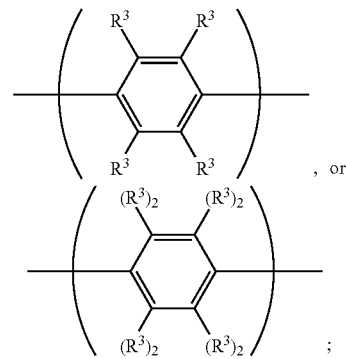

, or

;

$R^3$ is independently hydrogen, or halogen; $Z^1$, $Z^2$, and $Z^3$ are independently single bond, —$CH_2$—, —$(CH_2)_2$—, —$(CH_2)_4$—, —$CH_2O$—, —$OCH_2$—, —CF=CF—, —$(CH_2)_2CF_2O$—, —$(CH_2)_2OCF_2$—, —$OCF_2(CH_2)_2$—, —$CF_2O(CH_2)_2$—, —COO—, —OCO—, —$CF_2O$—, —$OCF_2$—, —C≡C—, —CH=CH—, —CH=CH—$(CH_2)_2$—, or —$(CH_2)_2$—CH=CH—; and n and m are independently 1 or 0.

12 Claims, No Drawings

LIQUID-CRYSTAL COMPOUND, LIQUID-CRYSTAL COMPOSITION AND LIQUID-CRYSTAL DISPLAY DEVICE

CROSS REFERENCE TO RELATED APPLICATIONS

The application is based on, and claims priorities from China Application Serial Number 201410352442.2, filed on Jul. 23, 2014, and Taiwan Application Serial Number 104114861, filed on May 11, 2015, the disclosure of which are hereby incorporated by reference herein in their entirety.

TECHNICAL FIELD

The disclosure relates to a liquid-crystal compound, composition, and device employing the same and, more particularly, to a liquid-crystal compound with high dielectric anisotropy and low rotational viscosity, composition, and device employing the same.

BACKGROUND

Among various flat-panel displays, the liquid-crystal display (LCD) has become the mainstream in the market because of its superior characteristics, such as light weight, low power consumption, no radiation, and full color image. As technologies used in optoelectronics and semiconductors have advanced, liquid-crystal displays with high resolution, rapid response time and high image quality have flourished accordingly. For example, active matrix liquid-crystal displays with thin-film transistors are generally substituted for passive matrix liquid-crystal displays (such as twisted nematic (TN) LCD, super twisted nematic (STN) LCD, or bistable twisted nematic (BTN) LCD). To fulfill the demand for wide viewing technology, the development of wide viewing LCD such as in-plane switching (IPS) LCD, fringe field switching (FFS) LCD, vertical alignment (VA), and polymer sustained alignment (PSA) is quite important.

In order to enhance the characteristics of a liquid-crystal display device, a liquid-crystal composition used by the device may be equipped with suitable properties, such as high dielectric anisotropy ($\Delta\epsilon$), low rotational viscosity ($\gamma 1$), and suitable birefringence. Specifically, a liquid-crystal composition with high dielectric anisotropy facilitates the reduction of the threshold voltage (Vth) of the liquid-crystal device employing the same; a liquid-crystal composition with a low rotational viscosity has a fast response time; and a liquid-crystal composition with a high clearing point exhibits a broad operating temperature range.

SUMMARY

An exemplary embodiment of the disclosure attempts to provide a liquid-crystal compound of Formula (I):

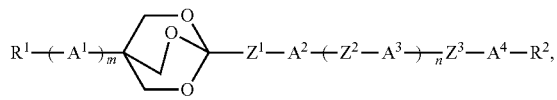

Formula (I)

wherein $R^1$ is hydrogen, $C_{1-10}$ alkyl, or $C_{2-10}$ alkenyl; $R^2$ is $C_{2-10}$ alkenyl, or $C_{2-10}$ fluoroalkenyl, in which one or two nonadjacent —CH$_2$— is replaced by —O—, or $C_{2-10}$ ether; $A^1$, $A^2$, $A^3$, and $A^4$ are independently

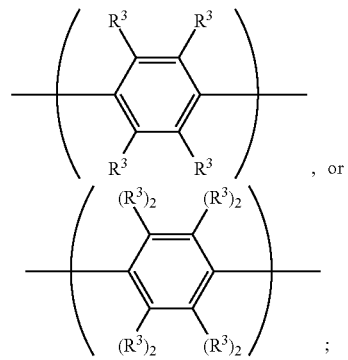

$R^3$ is independently hydrogen, or halogen; $Z^1$, $Z^2$, and $Z^3$ are independently single bond, —CH$_2$—, —(CH$_2$)$_2$—, —(CH$_2$)$_4$—, —CH$_2$O—, —OCH$_2$—, —CF=CF—, —(CH$_2$)$_2$CF$_2$O—, —(CH$_2$)$_2$OCF$_2$—, —OCF$_2$(CH$_2$)$_2$—, —CF$_2$O(CH$_2$)$_2$—, —COO—, —OCO—, —CF$_2$O—, —OCF$_2$—, —C≡C—, —CH=CH—, —CH=CH—(CH$_2$)$_2$—, or —(CH$_2$)$_2$—CH=CH—; and n and m are independently 1 or 0.

Another exemplary embodiment of the disclosure attempts to provide a liquid-crystal composition, including at least one of the liquid-crystal compounds of Formula (I), and at least one of a liquid-crystal compound of Formula (II)

$$R^4-A^5\!-\!\!\left(\!Z^4\!-\!A^6\!\right)_{\!i}\!\!\left(\!Z^5\!-\!A^7\!\right)_{\!j}\!\!\left(\!Z^6\!-\!A^8\!\right)_{\!k}\!\!R^5 \quad \text{Formula (II)}$$

wherein $R^4$ is hydrogen, $C_{1-10}$ alkyl, or $C_{2-10}$ alkenyl; $R^5$ is hydrogen, halogen, cyano group, $C_{1-10}$ alkyl, $C_{2-10}$ alkenyl, $C_{1-10}$ fluoroalkyl, $C_{2-10}$ fluoroalkenyl, or above groups in which arbitrary —CH$_2$— is replaced by —O—, and plural —CH$_2$— adjacent to each other are not replaced simultaneously; $A^5$, $A^6$, $A^7$, and $A^8$ are independently

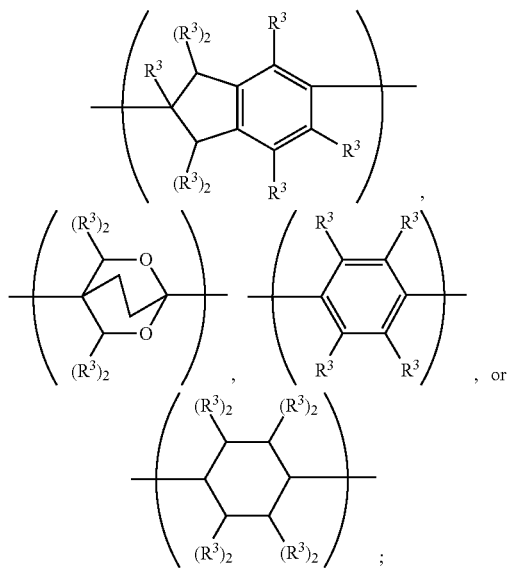

$R^3$ is independently hydrogen, or halogen; $Z^4$, $Z^5$, and $Z^6$ are independently single bond, —$CH_2$—, —$(CH_2)_2$—, —$(CH_2)_4$—, —$CH_2O$—, —$OCH_2$—, —$CF=CF$—, —$(CH_2)_2CF_2O$—, —$(CH_2)_2OCF_2$—, —$OCF_2(CH_2)_2$—, —$CF_2O(CH_2)_2$—, —$COO$—, —$OCO$—, —$CF_2O$—, —$OCF_2$—, —$C\equiv C$—, —$CH=CH$—, —$CH=CH$—$(CH_2)_2$—, or —$(CH_2)_2$—$CH=CH$—; and i, j, and k are independently 1 or 0.

According to embodiments of the disclosure, the disclosure provides a liquid-crystal device. The liquid-crystal device includes the liquid-crystal composition of the disclosure.

A detailed description is given in the following embodiments with reference to the accompanying paragraphs.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

In the disclosure, ranges defined by "a numerical value to another numerical value" are shorthand representations used to avoid listing all of the numerical values in the specification. Therefore, the recitation of a specific numerical range is equivalent to the recitation of any and all numerical values in that numerical range and discloses a smaller numerical range defined by any two numerical values in that numerical range, as is the case with said numerical value and said smaller numerical range being disclosed in the specification. For instance, recitation of "an amount of 10% to 80%" discloses a range of "an amount of 20% to 40%" regardless of whether other numerical values were cited in the specification.

Herein, a group may represent a substituted or unsubstituted group, otherwise it is specifically stated whether the group is substituted. For example, an "alkyl group" may represent a substituted or unsubstituted alkyl group.

In the disclosure, the chemical structure of a compound is sometimes represented by a skeleton formula, in which carbon atoms, hydrogen atoms and carbon-hydrogen bonds could be omitted. However, it should be based on the plotted version when a functional group is clearly depicted in a structure.

The disclosure attempts to provide a liquid-crystal compound. Due to the liquid-crystal compound, the liquid-crystal composition employing the same may exhibit high dielectric anisotropy, low rotational viscosity, high acid resistance, high thermal and UV stabilities, and a high clearing point ($T_{ni}$). Furthermore, the display performance and quality of the liquid-crystal device employing the liquid-crystal composition of the disclosure can be improved.

The disclosure attempts to provide a liquid-crystal compound of Formula (I):

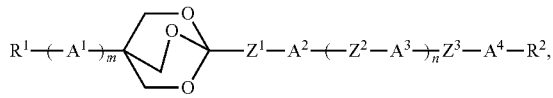

Formula (I)

wherein $R^1$ can be hydrogen, $C_{1-10}$ alkyl, or $C_{2-10}$ alkenyl; $R^2$ can be $C_{2-10}$ alkenyl, or $C_{2-10}$ fluoroalkenyl, in which one or two nonadjacent —$CH_2$— is replaced by —$O$—, or $C_{2-10}$ ether; $A^1$, $A^2$, $A^3$, and $A^4$ can be independently

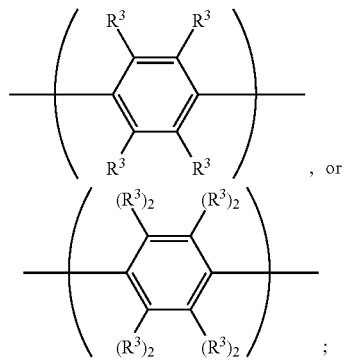

$R^3$ can be independently hydrogen, or halogen (fluorine atom (hereafter noted as fluorine), chlorine atom, or bromine atom); $Z^1$, $Z^2$, and $Z^3$ can be independently single bond, —$CH_2$—, —$(CH_2)_2$—, —$(CH_2)_4$—, —$CH_2O$—, —$OCH_2$—, —$CF=CF$—, —$(CH_2)_2CF_2O$—, —$(CH_2)_2OCF_2$—, —$OCF_2(CH_2)_2$—, —$CF_2O(CH_2)_2$—, —$COO$—, —$OCO$—, —$CF_2O$—, —$OCF_2$—, —$C\equiv C$—, —$CH=CH$—, —$CH=CH$—$(CH_2)_2$—, or —$(CH_2)_2$—$CH=CH$—; and n and m can be independently 1 or 0.

According to embodiments of the disclosure, $R^1$ can be straight or branched $C_{1-10}$ alkyl, or $C_{2-10}$ alkenyl. For example, $R^1$ can be methyl, ethyl, propyl, butyl, pentyl, hexyl, heptyl, octyl, vinyl, or propenyl. In the disclosure, $R^2$ can be an unsubstituted $C_{2-10}$ alkenyl. $R^2$ can be $C_{2-10}$ fluoroalkenyl, wherein fluoroalkenyl means that at least one hydrogen of alkenyl is replaced with fluorine. Furthermore, $R^2$ can be a substituted $C_{2-10}$ alkenyl, or $C_{2-10}$ fluoroalkenyl, wherein one or two nonadjacent —$CH_2$— is replaced by —$O$—, or $C_{2-10}$ ether. In addition, $R^2$ can be $C_{2-10}$ alkenyl, $C_{2-10}$ alkenyloxy, $C_{2-10}$ alkenyloxyalkyl, $C_{2-10}$ alkoxyalkenyl. Moreover, $R^2$ can be $C_{2-10}$ alkenyl, $C_{2-10}$ alkenyloxy, $C_{2-10}$ alkenyloxyalkyl, or $C_{2-10}$ alkoxyalkenyl in which arbitrary hydrogen bonded to the carbon is replaced by fluorine. The aforementioned groups of $R^2$ can be straight or branched. For Example, butyl of the disclosure means n-butyl, sec-butyl, iso-butyl, or tert-butyl. According to other embodiments of the disclosure, $R^2$ can be —$OCHCF_2$, —$OCF_2CHCF_2$, —$OCHCHCH_3$, —$OCF_2CFCF_2$, or —$OCH_2CF_3$.

According to embodiments of the disclosure, $A^1$, $A^2$, $A^3$, and $A^4$ can be independently

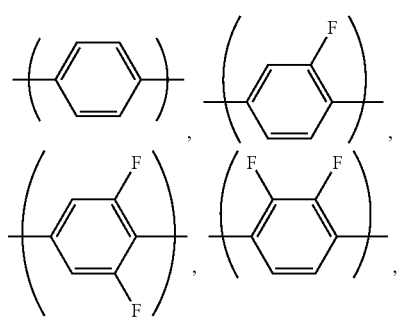

-continued

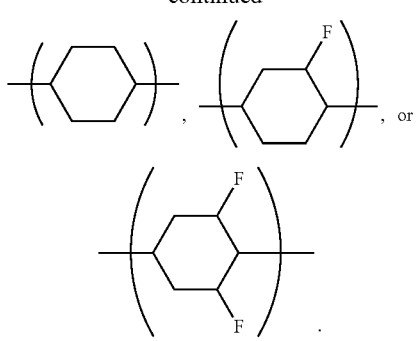

According to embodiments of the disclosure, $Z^1$, $Z^2$, and $Z^3$ can be independently single bond, —C₂H₄—, —COO—, —OCO—, —CF₂O—, —OCF₂—, —C≡C—, or —CH═CH—. According to embodiments of the disclosure, since n and m can be independently 1 or 0, the liquid-crystal compound of Formula (I) can be a compound having 3-5 rings. In an embodiment, n and m can both be 0, and the liquid-crystal compound of Formula (I) has 3 rings, and thus the 2,6,7-trioxabicyclo[2.2.2]octane moiety

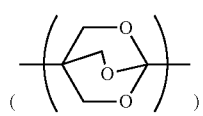

directly bonds with $R^1$.

According to embodiments of the disclosure, the liquid-crystal compound of Formula (I) can be

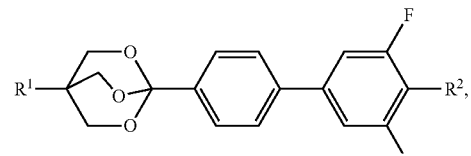

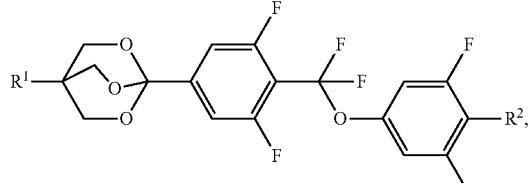

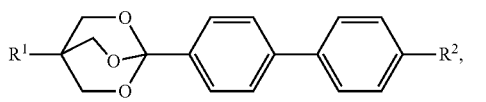

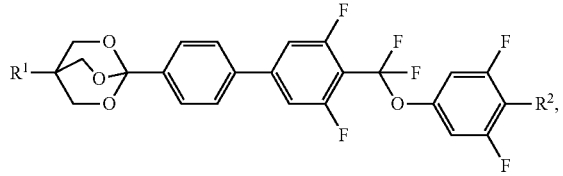

wherein $R^1$ and $R^2$ are as previously defined. For example, the liquid-crystal compound of Formula (I) can be

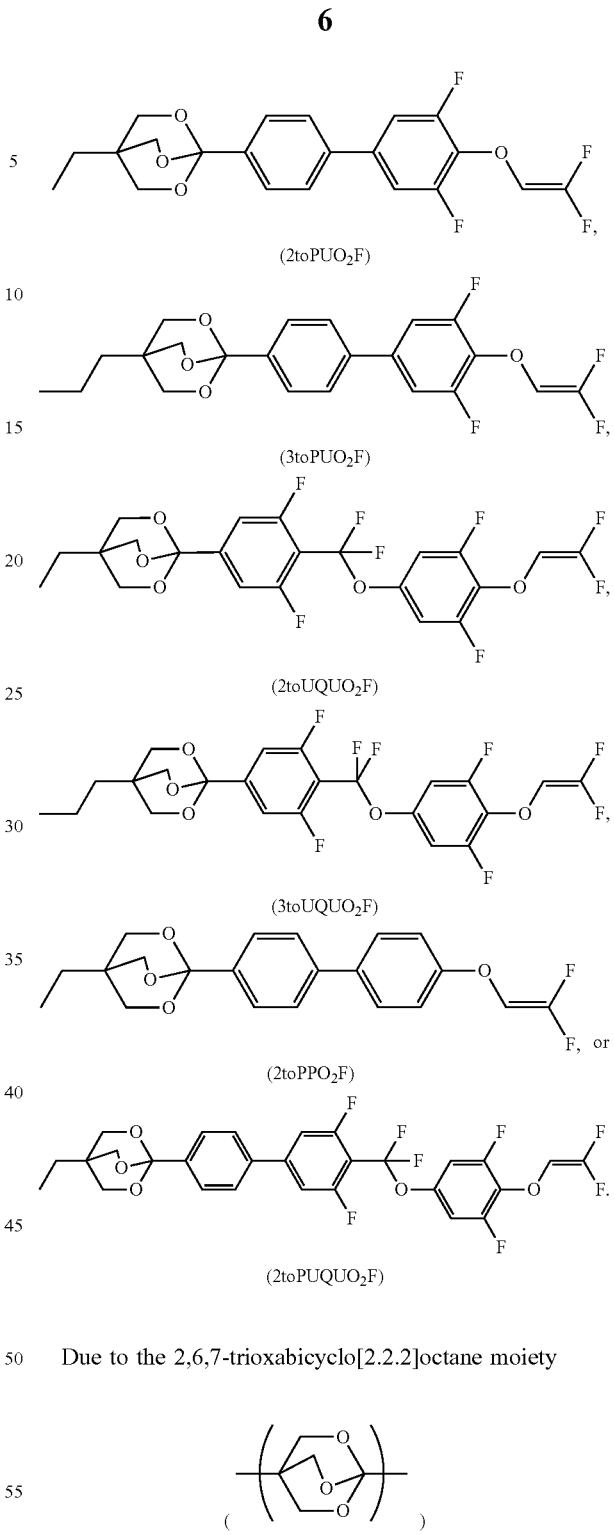

Due to the 2,6,7-trioxabicyclo[2.2.2]octane moiety and the terminal $R^2$ group (unsubstituted or substituted alkenyl group having 2-10 carbon atoms), the liquid-crystal compound of Formula (I) can exhibit high dielectric anisotropy, low rotational viscosity and a high clearing point ($T_{ni}$) Furthermore, the liquid-crystal compound of Formula (I) can further exhibit low rotational viscosity, high acid resistance, high thermal and UV stabilities by means of the specific linking groups (such as $Z^1$, $Z^2$, and/or $Z^3$) or functional groups ($R^2$ and/or $R^3$ (such as fluorine)).

According to embodiments of the disclosure, the liquid-crystal compound of Formula (I) can be

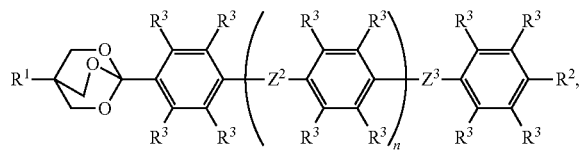

wherein $R^1$, $R^2$, $R^3$, $Z^2$, $Z^3$, and n are as previously defined. According to embodiments of the disclosure, the liquid-crystal compound of Formula (I) can be

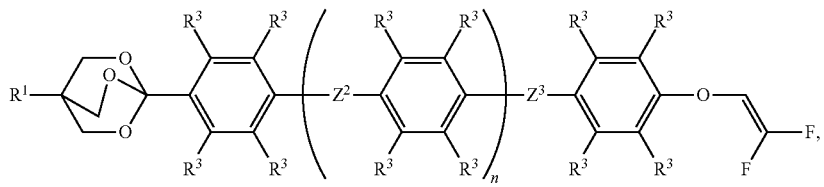

wherein $R^1$, $R^3$, $Z^2$, $Z^3$, and n are as previously defined. Furthermore, according to embodiments of the disclosure, the liquid-crystal compound of Formula (I) can be

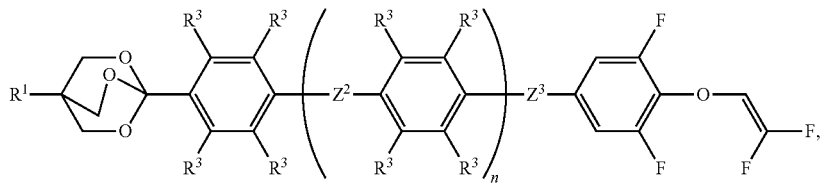

wherein $R^1$, $R^3$, $Z^2$, $Z^3$, and n are as previously defined.

According to embodiments of the disclosure, the disclosure also attempts to provide a liquid-crystal composition, including at least one of the liquid-crystal compounds of Formula (I); and at least one of a liquid-crystal compound of Formula (II)

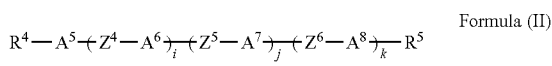

wherein $R^4$ is hydrogen, $C_{1-10}$ alkyl, or $C_{2-10}$ alkenyl; $R^5$ is hydrogen, halogen, cyano group, $C_{1-10}$ alkyl, $C_{2-10}$ alkenyl, $C_{1-10}$ fluoroalkyl, $C_{2-10}$ fluoroalkenyl, or above groups in which arbitrary —$CH_2$— is replaced by —O—, and plural —$CH_2$— adjacent to each other are not replaced simultaneously; $A^5$, $A^6$, $A^7$, and $A^8$ are independently

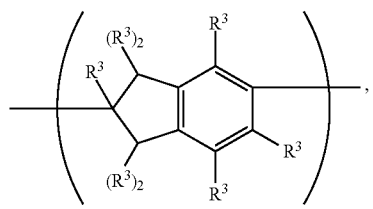

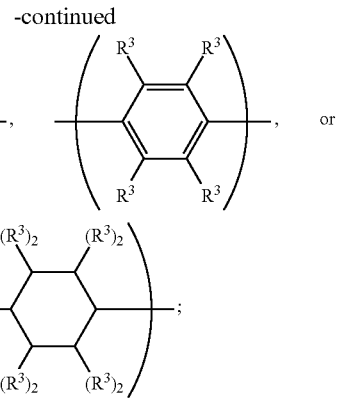

$R^3$ is independently hydrogen, or halogen; $Z^4$, $Z^5$, and $Z^6$ are independently single bond, —$CH_2$—, —$(CH_2)_2$—, —$(CH_2)_4$—, —$CH_2O$—, —$OCH_2$—, —$CF$=$CF$—, —$(CH_2)_2CF_2O$—, —$(CH_2)_2OCF_2$—, —$OCF_2(CH_2)_2$—, —$CF_2O(CH_2)_2$—, —COO—, —OCO—, —$CF_2O$—, —$OCF_2$—, —C≡C—, —CH=CH—, —CH=CH—$(CH_2)_2$—, or —$(CH_2)_2$—CH=CH—; and i, j, and k are independently 1 or 0.

According to embodiments of the disclosure, the liquid-crystal composition can include 0.1-90 wt %, preferably 2-50 wt %, more preferably 2.5-25 wt % of the liquid-crystal compound of Formula (I) and 0.1-99.9 wt %, preferably 2-95 wt %, more preferably 50-91 wt % of the liquid-crystal compound of Formula (II), based on the total weight of the liquid-crystal composition. Moreover, the liquid-crystal composition can include other components (such as chiral dopant, UV stabilizers, antioxidant, free radical scavenger, or nanoparticle).

According to embodiments of the disclosure, $R^4$ can be straight or branched $C_{1-10}$ alkyl, or $C_{2-10}$ alkenyl. For example, $R^4$ can be methyl, ethyl, propyl, butyl, pentyl, hexyl, heptyl, octyl, vinyl, or propenyl. In the disclosure, $R^5$ can be an unsubstituted $C_{1-10}$ alkyl or $C_{2-10}$ alkenyl. $R^5$ can be $C_{1-10}$ fluoroalkyl or $C_{2-10}$ fluoroalkenyl, wherein fluoroalkyl (or fluoroalkenyl) means that at least one hydrogen of alkyl (or alkenyl) is replaced with fluorine. For example, fluoromethyl of the disclosure means mono-fluoromethyl, difluoromethyl, or trifluoromethyl. Furthermore, $R^5$ can be a substituted $C_{1-10}$ alkyl, $C_{2-10}$ alkenyl, $C_{1-10}$ fluoroalkyl, or $C_{2-10}$ fluoroalkenyl, wherein arbitrary —$CH_2$— can be replaced by —O—, and plural —CH$_2$— adjacent to each other can be not replaced simultaneously. In addition, R$^5$ can be C$_{2-10}$ alkoxy, C$_{2-10}$ alkenyl, C$_{2-10}$ alkenyloxy, C$_{2-10}$ alkoxyalkyl, C$_{2-10}$ alkenyloxyalkyl, C$_{2-10}$ alkoxyalkenyl. Moreover, R$^5$ can be C$_{2-10}$ alkyl, C$_{2-10}$ alkoxy, C$_{2-10}$ alkenyl, C$_{2-10}$ alkenyloxy, C$_{2-10}$ alkoxyalkyl, C$_{2-10}$ alkenyloxyalkyl, or C$_{2-10}$ alkoxyalkenyl in which arbitrary hydrogen bonded to the carbon is replaced by fluorine. The aforementioned groups of R$^5$ can be straight or branched. For Example, butyl of the disclosure means n-butyl, sec-butyl, iso-butyl, or tert-butyl. According to embodiments of the disclosure, R$^5$ can be hydrogen, fluorine, fluoromethyl, ethyl, ethyl, propyl, butyl, pentyl, hexyl, heptyl, octyl, fluoromethyl, fluoroethyl, fluoropropyl, fluorobutyl, fluoropentyl, fluorohexyl, fluoroheptyl, fluorooctyl, fluorononyl, fluorodecyl, methoxy, ethoxy, propoxy, butoxy, pentyloxy, hexyloxy, heptyloxy, octyloxy, fluoromethoxy, fluoroethoxy, methoxymethyl, methoxyethyl, vinyl, or propenyl. According to other embodiments of the disclosure, R$^5$ can be hydrogen, fluorine, —OCF$_3$, —CF$_3$, —OCHCF$_2$, —OCF$_2$CHCF$_2$, —OCHCHCH$_3$, OCF$_2$CFCF$_2$, or —OCH$_2$CF$_3$.

According to embodiments of the disclosure, A$^5$, A$^6$, A$^7$, and A$^8$ are independently

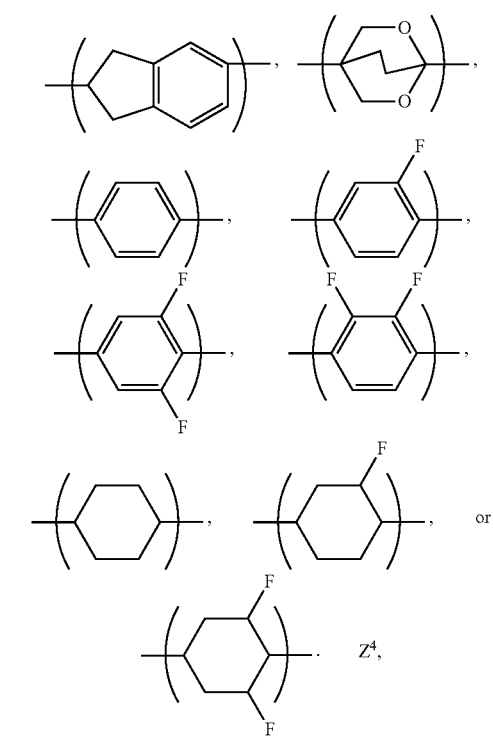

Z$^5$, and Z$^6$ can be independently single bond, —C$_2$H$_4$—, —COO—, —OCO—, —CF$_2$O—, —OCF$_2$—, —C≡C—, or —CH=CH—. According to embodiments of the disclosure, the liquid-crystal compound of Formula (II) can be

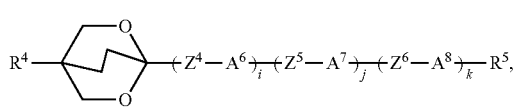

wherein R$^4$, Z$^4$, Z$^5$, Z$^6$, R$^5$, i, j, and k are as previously defined, and A$^6$, A$^7$, and A$^8$ are independently

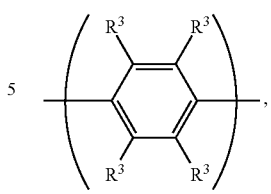 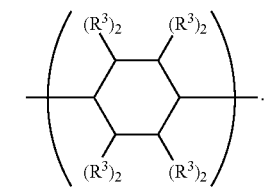

R$^3$ is independently hydrogen, or halogen. For example, the liquid-crystal compound of Formula (II) can be

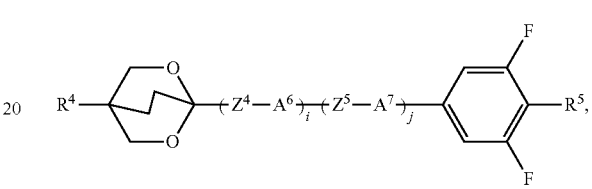

wherein R$^4$, Z$^4$, Z$^5$, R$^5$, i, and j are as previously defined, and A$^6$ and A$^7$ are independently

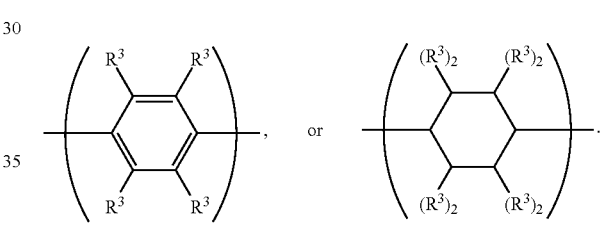

R$^3$ is independently hydrogen, or halogen.

According to embodiments of the disclosure, the liquid-crystal compound of Formula (II) can be

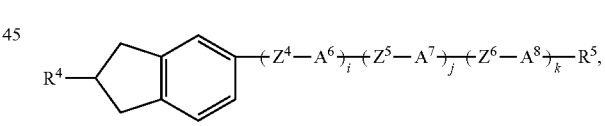

wherein R$^4$, Z$^4$, Z$^5$, Z$^6$, R$^5$, i, j and k are as previously defined, and A$^6$, A$^7$, and A$^8$ are independently

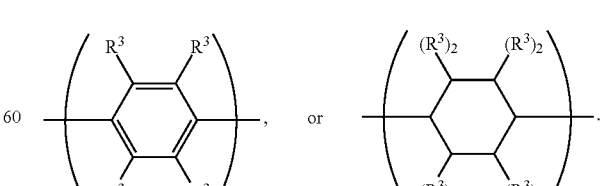

R$^3$ is independently hydrogen, or halogen. For example, the liquid-crystal compound of Formula (II) can be

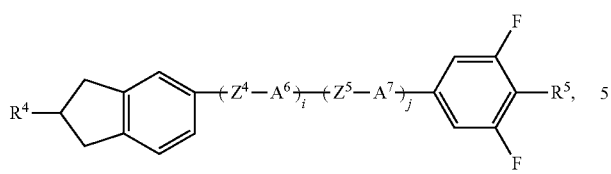
wherein R⁴, Z⁴, Z⁵, R⁵, i, and j are as previously defined, and A⁶ and A⁷ are independently
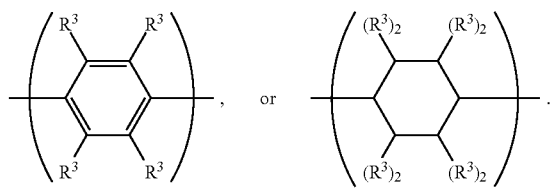
R³ is independently hydrogen, or halogen.
According to embodiments of the disclosure, the liquid-crystal compound of Formula (II) can be
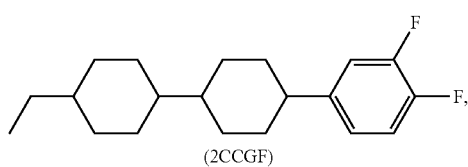
(2CCGF)
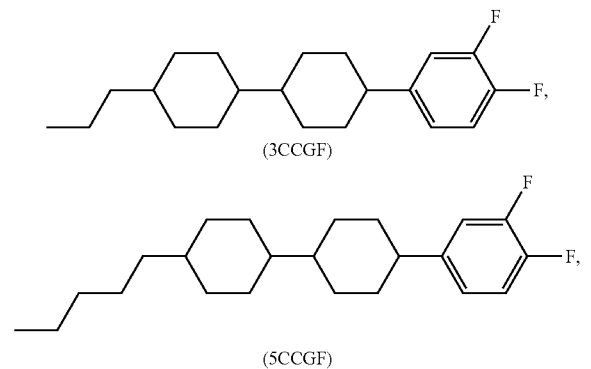
(3CCGF)
(5CCGF)
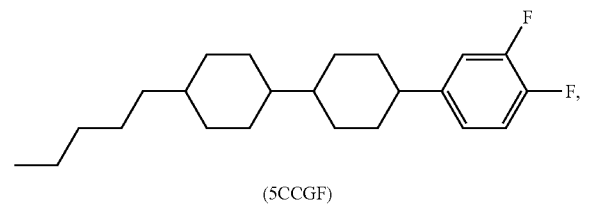
(2doPUF)
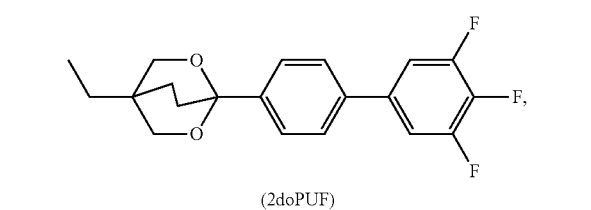
(2doPUO₂F)
-continued
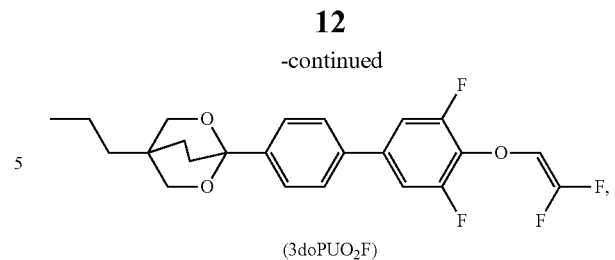
(3doPUO₂F)
(5doPUO₂F)
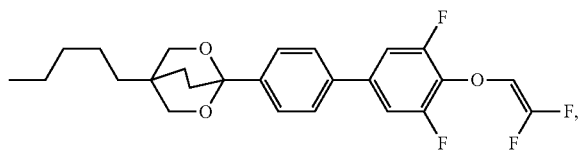
(2doPUQUF)
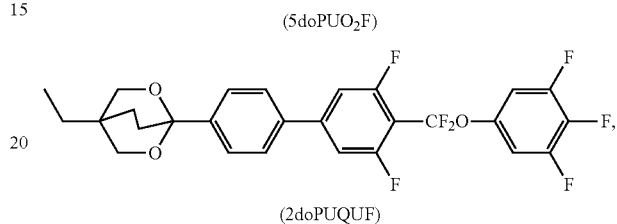
(3doPUQUF)
(2doUQUF)
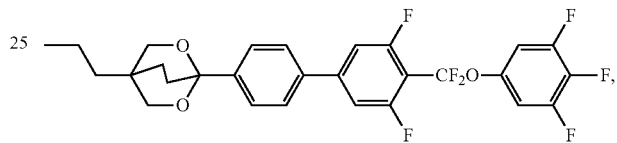
(3RIUQUOCF₃)
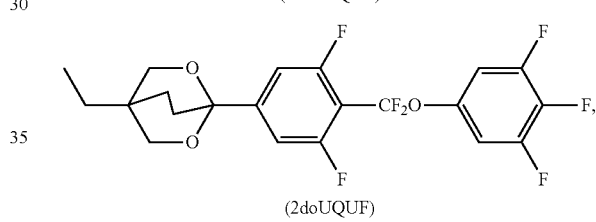
(2RIGUO₂F)
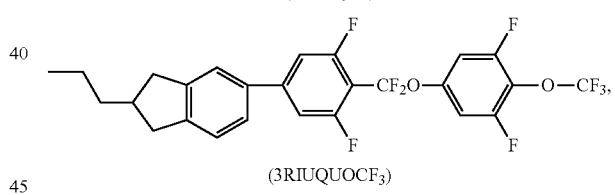
(3RIPUO₂F)
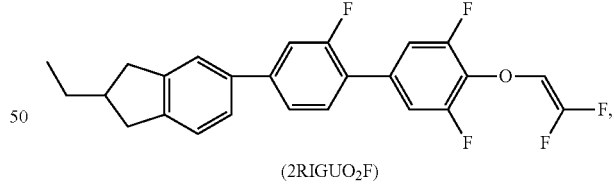
(2RIGUQUO₂F)

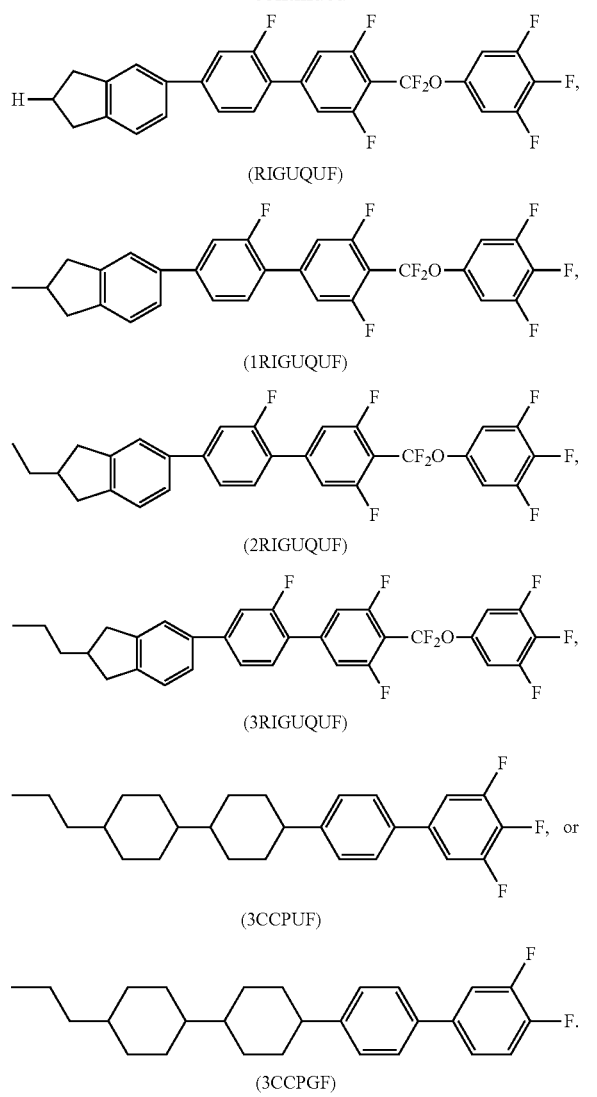
Furthermore, the liquid-crystal compound of Formula (II) can be
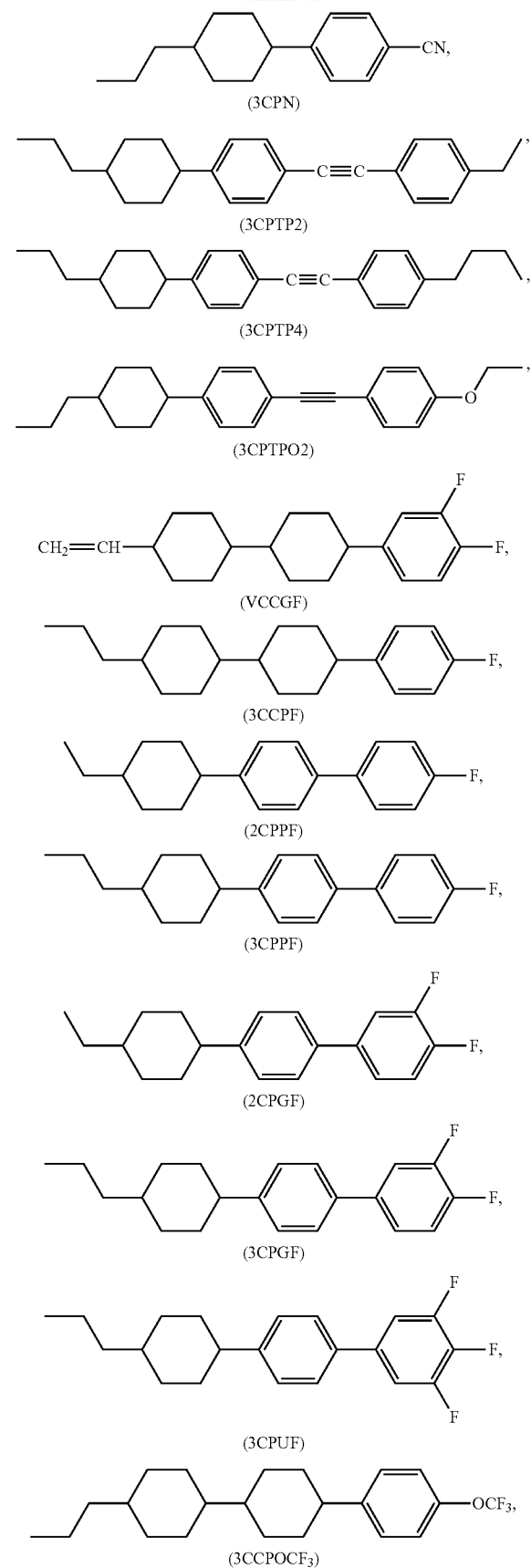

-continued

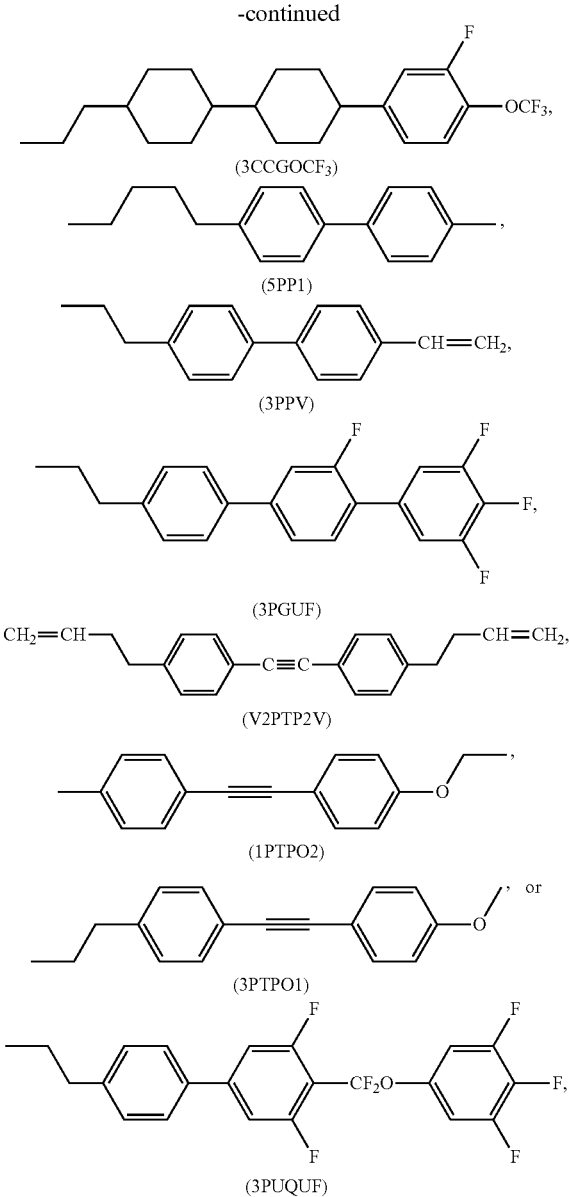

wherein the groups represented by the symbols are shown in Table 1. Furthermore, the terminal number with a normal size of the above liquid-crystal compound represents an alkyl group having the corresponding carbon atoms, and the number located between the symbols with a normal size of the above liquid-crystal compound represents a divalent alkyl group having the corresponding carbon atoms. Moreover, the groups are directly combined to represent the liquid-crystal compound according to Table 1. For Example, the liquid-crystal compound with an abbreviation of 3CPGF has a structure of rather than

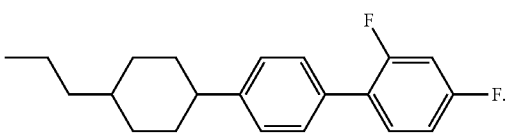 [SMILES: CCCC1CCC(c2ccc(-c3ccc(F)cc3F)cc2)CC1]

TABLE 1

| Symbol | Group |
|---|---|
| P | phenylene |
| C | cyclohexylene |
| G | 2-fluoro-phenylene |
| Q | —(CF$_2$O)— |
| UF | 2,3,5-trifluoro-phenylene |
| U | 2,3-difluoro-phenylene |
| CF$_3$ | —(CF$_3$) |
| T | —(C≡C)— |
| V | —(CH=CH$_2$) |
| V1 | —(CH=CH—CH$_3$) |
| O | —(O)— |
| N | —(CN) |
| GF | 2,3-difluoro-phenylene |
| PF | 4-fluoro-phenylene |

TABLE 1-continued

| | |
|---|---|
| O₂F | 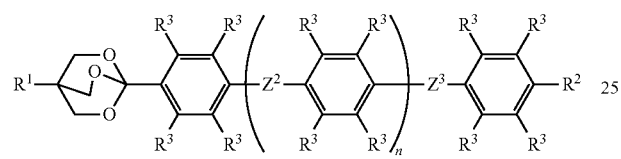 |
| do | |
| RI | |

According to embodiments of the liquid-crystal composition of the disclosure, when the liquid-crystal compound of Formula (I) is

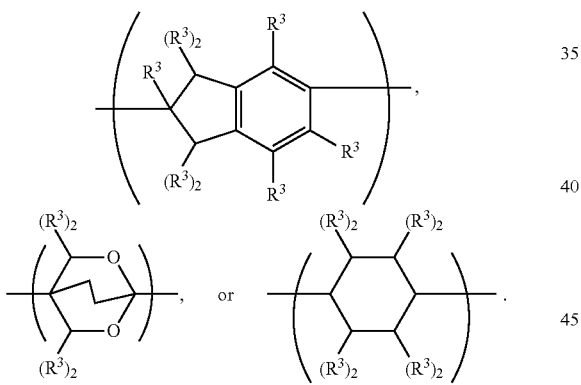

(wherein $R^1$, $R^2$, $R^3$, $Z^2$, $Z^3$, and n are as previously defined), at least one of $A^5$, $A^6$, $A^7$, and $A^8$ of the liquid-crystal compound of Formula (II) is According to embodiments of the liquid-crystal composition of the disclosure, when the liquid-crystal compound of Formula (I) is

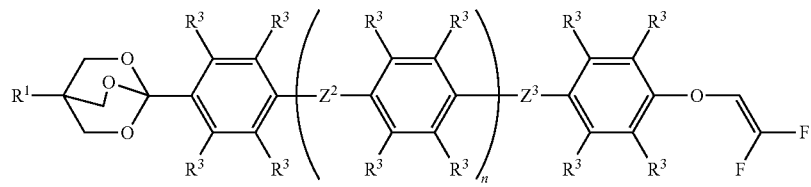

or (wherein $R^1$, $R^3$, $Z^2$, $Z^3$, and n are as previously defined), at least one of $A^5$, $A^6$, $A^7$, and $A^8$ of the liquid-crystal compound of Formula (II) is

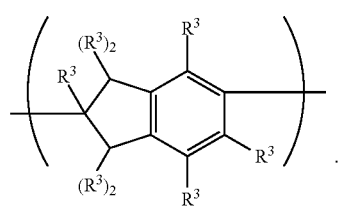

For example, when $A^6$ is

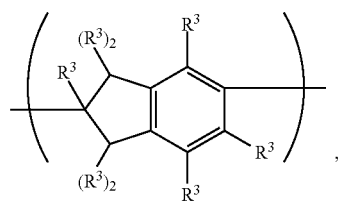

i is 1; when $A^7$ is

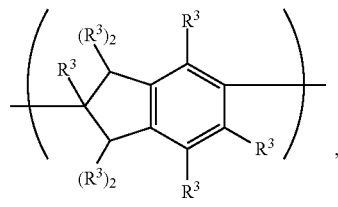

j is 1; and when $A^8$ is

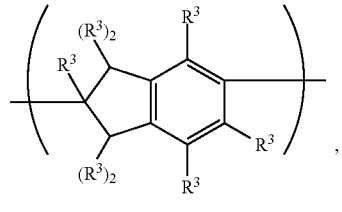

k is 1.

According to embodiments of the liquid-crystal composition of the disclosure, when the liquid-crystal compound of Formula (I) is

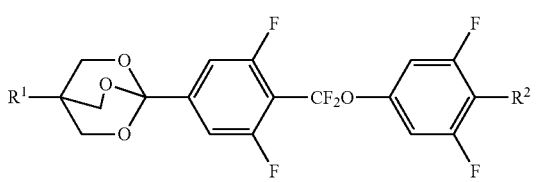

(wherein $R^1$ is hydrogen, $C_{1-10}$ alkyl, or $C_{2-10}$ alkenyl; and, $R^2$ is —OCHCF$_2$, or —OCF$_2$CFCF$_2$), the liquid-crystal compound of Formula (II) is

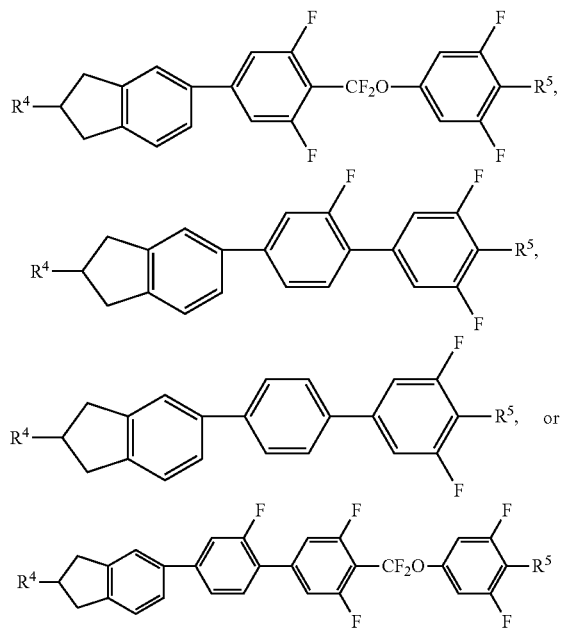

(wherein $R^4$ is hydrogen, $C_{1-10}$ alkyl, or $C_{2-10}$ alkenyl; and, $R^5$ is hydrogen, fluorine, —OCF$_3$, —CF$_3$, —OCH=CF$_2$, or —OCH$_2$—CF$_3$).

According to embodiments of the disclosure, the disclosure attempts to provide a liquid-crystal device. One feature of the liquid-crystal device is that the aforementioned liquid-crystal composition is employed. Besides the liquid-crystal composition, the liquid-crystal device can further include other elements known in the art, such as substrate, polarizer, color filter, or alignment film. The fabrication method is application dependent, and would be selected from the known art by one of ordinary skill in the art, and therefore will not be described herein.

Since the liquid-crystal device of the disclosure employs the aforementioned liquid-crystal composition, the liquid-crystal device exhibits not only low threshold voltage and short response time, but also high display quality and wide working temperature range.

In order to clearly disclose the liquid-crystal compound and the liquid-crystal composition of the disclosure, the following examples are intended to illustrate the disclosure more fully without limiting the scope, since numerous modifications and variations will be apparent to those skilled in this art.

Effects of the abovementioned embodiments will be evinced through the experimental examples. Although some experimental details are specifically described in the following section, the material used, the amount thereof, and the detailed process flow can be suitably modified without departure from the scope of this disclosure. Therefore, the scope of this disclosure should not be limited by the following experiments.

Liquid-Crystal Compound

Preparation Example 1

Method for Preparing Liquid-Crystal 2toPUO$_2$F

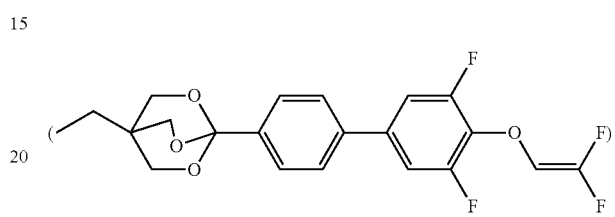

The liquid-crystal compound 2toPUO$_2$F was synthesized by the steps according to the following Scheme 1.

Scheme 1

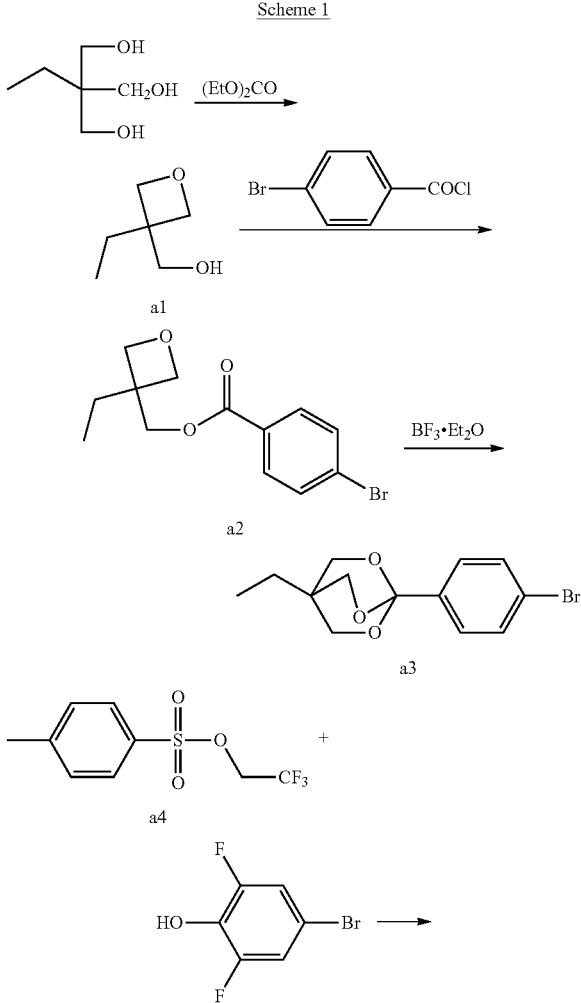

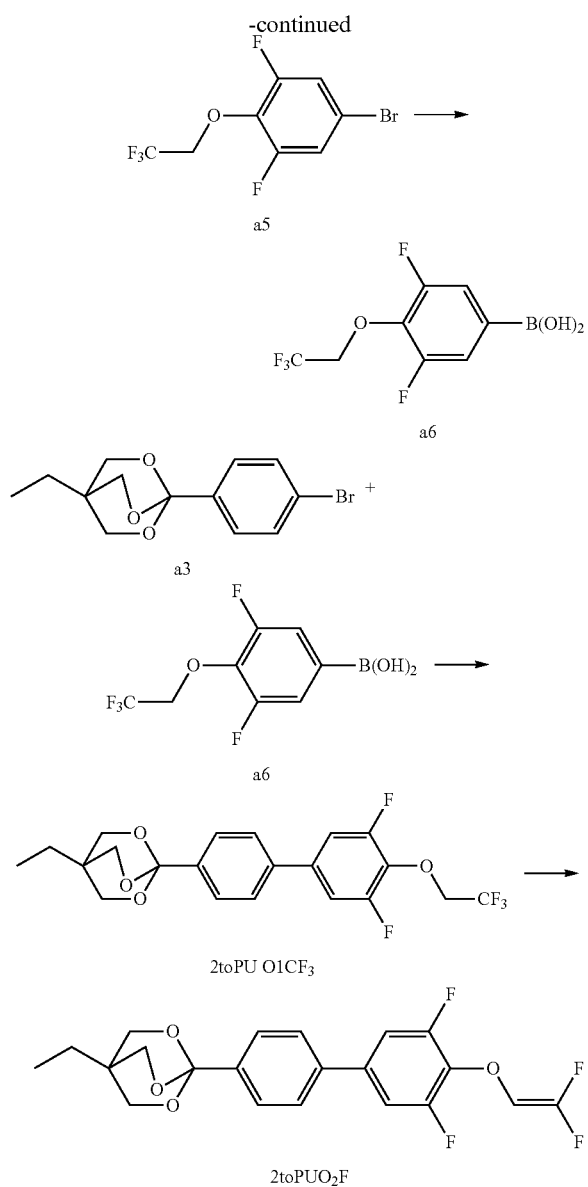

Preparation of Compound a2:

100 g of 1,1,1-trimethylolpropane, 132 g of diethyl carbonate, 0.25 g of potassium hydroxide, and 10 ml of ethanol were added into a reaction bottle. After heating to reflux for 2 hours, most of solvent was removed by distillation at 150° C. under atmospheric pressure to give a crude product. Then, distillation under vacuum was applied to purify the resulting crude product. Compound a1 (colorless liquid) was collected at 120° C. and under the pressure of 0.1 torr in a yield of 64.7%. Next, 82 g of compound a1, 111 g of pyridine, and 400 mL of dichloromethane were added into a reaction bottle. The mixture was stirred under nitrogen and then cooled to 0° C.-5° C. A solution of 163 g of 4-bromobenzoyl chloride in 200 ml of dichloromethane was dropwisely added into the reaction bottle at 0° C.-5° C. After the addition was complete, the reaction bottle was warmed to room temperature and stirred for another 8 hours, 500 mL of water was then added into the reaction bottle and stirred for 5 minutes. An organic layer was collected and a water layer was extracted two times using 100 mL of dichloromethane. The organic layer was combined and washed by 100 mL of brine to adjust the pH value around 7. Next, the combined organic layer was dried by 20 g anhydrous sodium sulfate for 30 minutes and filtrated. The filtrate was concentrated under reduced pressure and purified by flash chromatography with petroleum ether and ethyl acetate (9:1) to obtain compound a2, which was further recrystallized in cold ethanol, in a yield of 68.7%. The purity of the compound a2 (analyzed by gas chromatography (GC)) is 98.109%, and the melting point (mp) of compound a2 is 50.63° C.-52.56° C.

Preparation of Compound a3:

12 g of the compound a2 and 90 mL of dichloromethane were added into a reaction bottle and were stirred under nitrogen at 0° C. 1.4 g of boron trifluoride diethyl etherate complex was slowly added into the reaction bottle at 0° C. After the completion of addition, the mixture was stirred at 0° C. for 30 minutes, and then was allowed to warm to room temperature and stirred for 4 hours. After the reaction was complete (checked via thin layer chromatography (TLC)), the mixture was filtered through a short pad of celite, and the filtrate was concentrated and purified by column chromatography with petroleum ether and ethyl acetate (20:1), and triethylamine (1 vol %) to obtain a compound a3 (white solid) with a yield of 58%. The melting point (mp) of the compound a3 is 93.7° C.-97.5° C.

Preparation of Compound a4:

40 g of 2,2,2-trifluoroethanol, 80 g of triethylamine, and 160 mL of dichloromethane were added into a reaction bottle. The mixture was stirred under nitrogen. After cooling to −5° C.-0° C., 75 g of p-toluenesulfonyl chloride was added in 3 portions. Next, the reaction was warmed to room temperature and stirred for 4 hours. Next, 100 mL of water was added into the reaction bottle, and stirred for 5 minutes. An organic layer was collected, and a water layer was extracted two times using 100 mL of dichloromethane. The organic layer was combined and washed by 100 mL of brine to adjust pH value to around 7. Next, the combined organic layer was dried by 20 g anhydrous sodium sulfate for 30 minutes, filtrated and concentrated to give a crude product. Compound a4 was purified via recrystallization in cold ethanol to give a white solid in a yield of 67.3%. The purity of the compound a4 (analyzed by gas chromatography (GC)) is 99.976%.

Preparation of Compound a5:

6 g of sodium hydroxide aqueous solution (60%) and 70 mL of N,N-dimethyl formamide (DMF) were added into a reaction bottle. After cooling to −5° C.-0° C., 120 mL of DMF and 30 g of 4-bromo-2,6-difluorophenol were added. After the addition was complete, the reaction bottle was heated to 90° C.-95° C. Then, 40 g compound a4 in a solution of 200 mL DMF was added into the reaction bottle, and the reaction was heated to 110° C. and stirred for 6 hours. Next, the mixture was added into an ice water bath, and 25 mL of HCl aqueous solution was used to adjust the pH value around 7. Next, 100 mL of petroleum ether was added and the mixture was stirred for 5 minutes. An organic layer was collected, and a water layer was extracted two times using 100 mL of petroleum ether. The organic layer was combined and washed using 100 mL of brine to adjust the pH value to around 7. Next, the filtrate was concentrated, and purified by column chromatography with petroleum ether to obtain a compound a5 (colorless liquid) with a yield of 63.5%. The purity of the compound a5 (analyzed by gas chromatography (GC)) is 96.8%.

Preparation of Compound a6:

13 g of magnesium powder and 60 mL of ethyl ether were added into a reaction bottle. The mixture was stirred under nitrogen, and little 1,2-dibromoethane was added to promote the reaction. After cooling to 0° C.-10° C., 12 g of a compound a5 and 30 mL of ethyl ether were added into the reaction bottle. After the addition was complete, the mixture was stirred at 0° C.-10° C. for 1 hour. Next, after cooling to −70° C.--80° C., 15.6 g of triisopropyl borate was dropwisely added into the reaction bottle. After the addition was complete, the reaction bottle was warmed to −20° C. Next, 20 mL of diluent HCl aqueous solution was added into the reaction bottle and the resulting mixture was stirred for 5 minutes. An organic layer was collected, and a water layer was extracted two times using 20 mL of ethyl acetate. The organic layer was combined and washed by 50 mL of brine. Next, the combined organic layer was dried by 20 g anhydrous sodium sulfate for 30 minutes and filtrated. Finally, the filtrate was concentrated, obtaining a compound a6 (red viscous fluid) with a yield of 59%.

Preparation of Liquid-Crystal Compound 2toPUO1CF$_3$:

4 g of the compound a3, 3.8 g of the compound a6, 3.6 g of potassium carbonate, 0.1 g of tetrakis(triphenylphosphine)palladium, 0.5 g of tetrabutylammonium bromide (TBAB), 40 mL of tetrahydrofuran (THF), and 10 mL of water were added into a reaction bottle. Next, the mixture was stirred and heated to reflux at 70° C.-80° C. for 4 hours. Next, 50 mL of water was added into the reaction bottle and stirred for 5 minutes. An organic layer was collected, and a water layer was extracted three times using 30 mL of toluene. The organic layer was combined and washed using 50 mL of brine to adjust the pH value around 7. Next, the combined organic layer was dried by 20 g anhydrous sodium sulfate for 30 minutes and filtrated. Next, the filtrate was concentrated, and purified by flash chromatography with petroleum ether and ethyl acetate (20:1), and triethylamine (1 vol %) to give compound 2toPUO1CF$_3$ (white solid) with a yield of 63.1%. GCMS: m/z=430.2350[M]$^+$; $^1$H NMR (400 MHz, CDCl$_3$): δ(ppm) 0.879 (t, 3H, J=8 Hz), 1.320 (q, 2H, J=8 Hz), 3.651 (s, 2H), 4.105 (s, 6H), 6.255 (d, 1H, J=12 Hz), 7.127 (d, 2H, J=8.8 Hz), 7.463 (d, 2H, J=8 Hz), 7.676 (d, 2H, J=8 Hz).

Preparation of Liquid-Crystal Compound 2toPUO$_2$F:

5 g of diisopropylamine and 20 mL of THF were added into a reaction bottle. Next, the mixture was stirred under nitrogen, and then cooled to −10° C.-0° C. 13 mL of n-butyllithium was dropwisely added into the reaction bottle at −10° C.-0° C. After the addition was complete, the mixture was stirred at −10° C.-0° C. for 1 hours, obtaining a LDA agent. Next, 3.6 g of liquid-crystal compound 2toPUO1CF$_3$ in 20 mL of THF were added into another reaction bottle. Next, the mixture was stirred under nitrogen, and then cooled to −70° C.--80° C. After, the above LDA agent was dropwisely added into the reaction bottle. After the addition was complete, the mixture was stirred at −70° C.--80° C. for 2 hours. Next, 20 mL of water was added into the reaction bottle and then stirred for 5 minutes. An organic layer was collected, and a water layer was extracted two times using 20 mL of ethyl acetate. The organic layer was combined and washed using 50 mL of brine. Next, the combined organic layer was dried by 20 g anhydrous sodium sulfate for 30 minutes and filtrated. Next, the filtrate was concentrated and purified by column chromatography with petroleum ether and ethyl acetate (20:1) to give a liquid-crystal compound 2toPUO$_2$F (white solid) with a yield of 75%. The melting point (mp) of liquid-crystal compound 2toPUO$_2$F) is 169.16° C.-169.94° C. GCMS: m/z=410.4606 [M]$^+$; $^1$H NMR (400 MHz, CDCl$_3$): δ(ppm) 0.879 (t, 3H, J=8 Hz), 1.320 (q, 2H, J=8 Hz), 4.105 (s, 6H), 6.255 (d, 1H, J=12 Hz), 7.127 (d, 2H, J=8.8 Hz), 7.463 (d, 2H, J=8 Hz), 7.676 (d, 2H, J=8 Hz).

Preparation Example 2

Method for Preparing Liquid-Crystal Compound 2toUQUO$_2$F

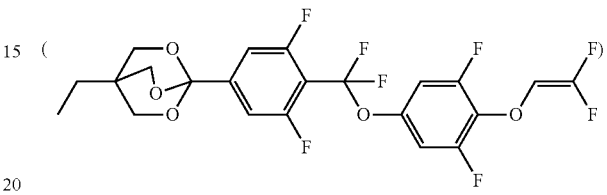

The liquid-crystal compound 2toUQUO$_2$F was synthesized by the steps according to the following Scheme 2.

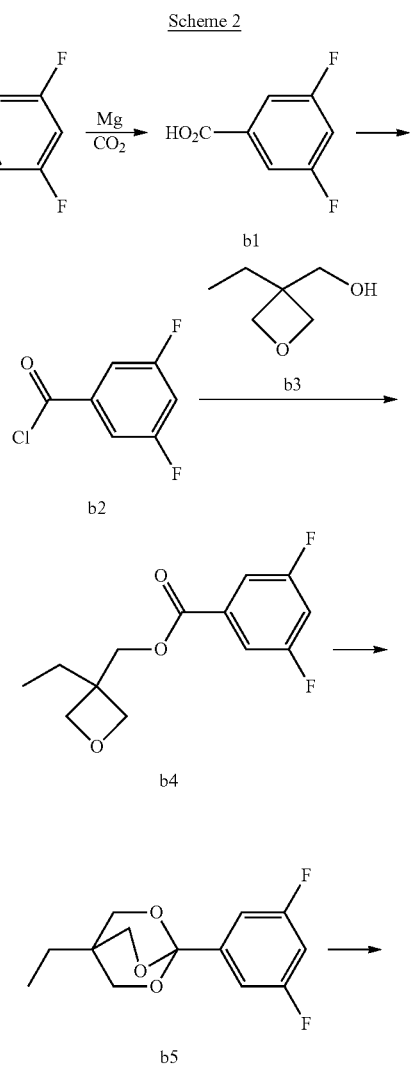

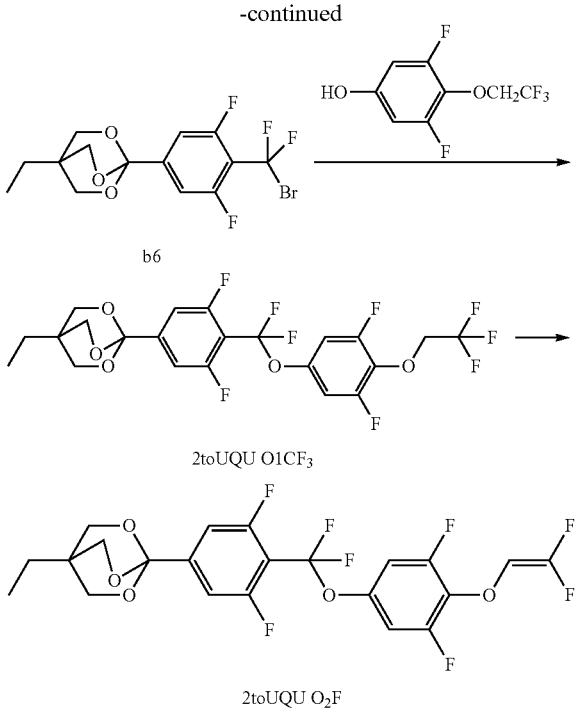

Preparation of Compound b1

28.8 g of magnesium powder, 50 mL of THF and 1-bromo-3,5-difluorobenzene were added into a reaction bottle. A solution of 193 g of 1-bromo-3,5-difluorobenzene in 600 mL of THF were dropwisely added into the reaction bottle, and the mixture was heated to reflux. After the addition was complete, the mixture was refluxed for another 1 hour. Next, after cooling to room temperature, 300 mL of THF was added, and then the mixture was cooled to −40° C.--50° C. Next, carbon dioxide gas was introduced to the reaction bottle at −40° C.--50° C. for 60 minutes. After warming to −20° C., the mixture was added into an ice water bath with HCl aqueous solution and then stirred for 5 minutes. An organic layer was collected, and a water layer was extracted two times using 100 mL of ethyl acetate. The organic layer was combined and washed by 100 mL of brine. Next, the combined organic layer was dried by 30 g anhydrous sodium sulfate for 30 minutes and filtrated. Next, after concentration, the resultant was recrystallized in petroleum ether and toluene to give a compound b1 (pale-yellow solid) with a yield of 58.8%. The melting point (mp) of the compound b1 is 121.11° C.-121.96° C.

Preparation of Compound b2:

70 g of 3,5-difluorobenzoic acid, 105 g of thionyl chloride, 250 mL of toluene and DMF were added into a reaction bottle. The mixture was heated to reflux for 4 hours. After cooling, the mixture was distilled under vacuum, obtaining a compound b2 (light red fluid) with a yield of 86.6%.

Preparation of Compound b4:

43 g of a compound b3 (the compound b3 was prepared according to the preparation of the compound a1), 70 g of pyridine, and 200 mL of dichloromethane were added into a reaction bottle. Next, the mixture was stirred under nitrogen, and then cooled to 0° C.-5° C. A solution of 68 g of the compound b2 in 100 mL of dichloromethane was dropwisely added into the reaction bottle. After the addition was complete, the reaction bottle was warmed to room temperature and stirred for 8 hours. Next, 100 mL of water was added into the reaction bottle and stirred for 5 minutes. An organic layer was collected, and a water layer was extracted two times using 100 mL of dichloromethane. The organic layer was combined and washed by 100 mL of brine to adjust the pH value to around 7. Next, the combined organic layer was dried by 20 g anhydrous sodium sulfate for 30 minutes and filtrated. Next, the filtrate was concentrated and purified by column chromatography with petroleum ether and ethyl acetate (9:1) to obtain a compound b4 (pale-yellow fluid) with a yield of 61.2%. The purity of the compound b4 (analyzed by gas chromatography (GC)) is 95.799%.

Preparation of Compound b5:

27 g of compound b4 and 300 mL of dichloromethane were added into a reaction bottle. The mixture was stirred under nitrogen at 0° C. 3.7 g of boron trifluoride diethyl etherate was dropwisely added into the reaction bottle at 0° C. After the addition was complete, the mixture was stirred at 0° C. for 30 minutes. Next, the reaction bottle was warmed to room temperature and stirred for another 4 hours. After the reaction was complete (checked via thin layer chromatography (TLC)), the mixture was mixed with 10.6 g of triethylamine and then stirred for 1 hour. Next, the mixture was filtered with celite. The filtrate was concentrated and purified by column chromatography with petroleum ether and ethyl acetate (1:1), and recrystallized in cold ethanol to obtain a compound b5 with a yield of 62.2%. The purity of the compound b5 (analyzed by gas chromatography (GC)) is 99.031%.

Preparation of Compound b6:

15.4 g of compound b5 and 160 mL of THF were added into a reaction bottle. The mixture was stirred under nitrogen, and then cooled to −70° C.--80° C. Next, 32 mL of n-butyllithium was dropwisely added into the reaction bottle. After the addition was complete, the mixture was stirred at −70° C.--80° C. for 1 hour. 38.6 g of difluorodibromomethane solution (55.5%) was dropwisely added into the reaction bottle. After the addition was complete, the reaction bottle was warmed to −30° C., and then slowly added into water. Next, 50 mL of ethyl acetate was added into the reaction bottle and stirred for 5 minutes. An organic layer was collected, and a water layer was extracted two times using 50 mL of ethyl acetate. The organic layer was combined and washed with 50 mL of brine to adjust the pH value to around 7. Next, the combined organic layer was dried by 20 g anhydrous sodium sulfate for 30 minutes and filtrated. The filtrate was purified by column chromatography with petroleum ether and ethyl acetate (95:5). After concentration, a compound b6 (light red fluid) with a yield of 95.6% was obtained.

Preparation of Liquid-Crystal Compound 2toUQUO1CF$_3$:

150 mL of water was added into a reaction bottle and heated to 50° C. Next, 9.6 g of 1-trifluoroethoxy-2,6-difluorophenol, 12 g of potassium carbonate, and 3.4 g of TBAB were added into the reaction bottle. After heating to 80° C., 22.5 g of a compound b6 was added into the reaction bottle. Next, the mixture was heated to reflux at 100° C. for 6 hours. Next, after cooling to room temperature, 50 mL of ethyl acetate was added into the reaction bottle and then stirred for 30 minutes. An organic layer was collected, and a water layer was extracted two times using 20 mL of ethyl acetate. The organic layer was combined and washed with 50 mL of brine. Next, the combined organic layer was dried by 20 g anhydrous sodium sulfate for 30 minutes and filtrated. The filtrate was concentrated and purified by column chromatography (using 3-4 folds silica gel) with petroleum ether and ethyl acetate (3:1), and triethylamine (1 vol %). Recrystallization by cold ethanol gives a liquid-crystal compound 2toUQUO1CF$_3$ in a yield of 66.6%. The purity of the liquid-crystal compound 2toUQUO1CF$_3$ (analyzed by gas chromatography (GC)) is 98.9%, and the melting point (mp) of the liquid-crystal compound 2toUQUO1CF$_3$ is 93.12° C.-94.31° C. GCMS: m/z=532.2276[M]$^+$; $^1$H NMR (400 MHz, CDCl$_3$): δ(ppm) 0.864 (t, 3H, J=8 Hz), 1.328 (q, 2H, J=8 Hz), 3.618 (q, 2H, J=11.2 Hz), 4.027 (s, 6H), 6.868 (d, 2H, J=8 Hz), 7.655 (d, 2H, J=8 Hz).

Preparation of Liquid-Crystal Compound 2toUQUO$_2$F:

20 g of diisopropylamine and 100 mL of THF were added into a reaction bottle. Next, the mixture was stirred under nitrogen, and then cooled to −10° C.-0° C. 53 mL of n-butyllithium was dropwisely added into the reaction bottle at −10° C.-0° C. After the addition was complete, the mixture was stirred at −10° C.-0° C. for 1 hour, obtaining a LDA agent. Next, 7 g of liquid-crystal compound 2toPUO1CF$_3$ and 100 mL of THF were added into another reaction bottle. The mixture was stirred under nitrogen, and then cooled to −70° C.--80° C. After, the above LDA agent was dropwisely added into the reaction bottle. After the addition was complete, the mixture was stirred at −70° C.--80° C. for 2 hours. Next, 20 mL of water was added into the reaction bottle and then stirred for 5 minutes. An organic layer was collected, and a water layer was extracted two times using 20 mL of ethyl acetate. The organic layer was combined and washed by 50 mL of brine. Next, the combined organic layer was dried by 20 g anhydrous sodium sulfate for 30 minutes and filtrated. After concentration, the resulting crude product was purified by column chromatography with petroleum ether and ethyl acetate (3:1), and triethylamine (1 vol %) to obtain 2toUQUO$_2$F in a yield of 75%. for further purification, 2toUQUO$_2$F was recrystallized in cold ethanol. The purity of liquid-crystal compound 2toUQUO$_2$F (analyzed by gas chromatography (GC)) is 98.9%, and the melting point (mp) of liquid-crystal compound 2toUQUO$_2$F is 66.69° C.-67.53° C. GC-MS: m/z=512.1960[M]$^+$; $^1$H NMR (400 MHz, CDCl$_3$): δ(ppm) 0.868 (t, 3H, J=8 Hz), 1.330 (q, 2H, J=8 Hz), 4.429 (s, 6H), 6.173 (d, 1H, J=12 Hz), 6.873 (d, 2H, J=8 Hz), 7.571 (d, 2H, J=8 Hz).

According to the methods for preparing liquid-crystal compounds, 2toPUO$_2$F, and 2toUQUO$_2$F disclosed above, those skilled in the art can understand the methods for preparing the liquid-crystal compounds 3toPUO$_2$F, 3toUQUO$_2$F, 2toPPO$_2$F, 2toPUQUO$_2$F and comparative liquid-crystal compound 2toPUF.

Preparation Example 3

Method for Preparing Liquid-Crystal Compound 2doPUF

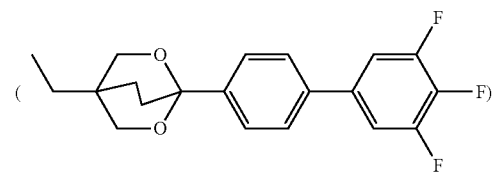

45 mL of THF (tetrahydrofuran) and 6.4 mL of diisopropylamine was added into a reaction bottle. After cooling to 0° C., 16 mL of n-butyllithium (2.5M) was dropwisely added into the reaction bottle. After stirring for 30 minutes at 0° C., 9 g of compound 1 was added into reaction bottle and then the mixture was stirred for 1 hour. Next, 8.5 g of compound 2 (dissolved in 10 mL of THF) was added to the above mixture. After warming to room temperature, the resultant was then heated to reflux for 18 hours. Upon the completion of reaction, 50 mL of water was added into the reaction bottle to quench the reaction. After extraction with ethyl acetate, an organic layer was collected and dried by anhydrous sodium sulfate. After filtration and concentration, the resultant was purified by column chromatography with ethyl acetate and n-hexane (1:10) to obtain 5.1 g of compound 3 (brown liquid). The synthesis pathway of the above reaction is as described following:

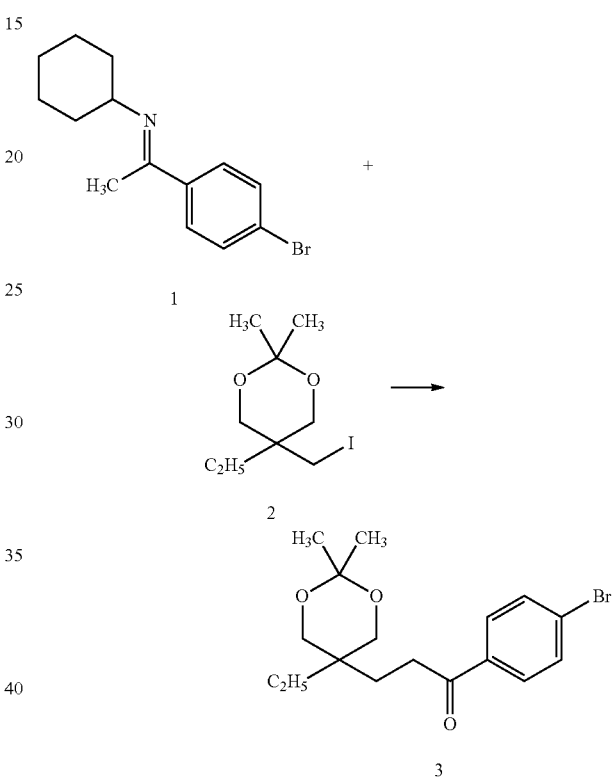

30 mL of THF, 2.9 g of the compound 3, and 30 mL of HCl aqueous solution (2N) were added into a reaction bottle. After stirring for 2 hours at room temperature, 50 mL of water was added into the reaction bottle to quench the reaction. An organic layer was collected and dried by anhydrous sodium sulfate. After filtration and concentration, the resultant was purified by column chromatography with ethyl acetate and n-hexane (1:10) to obtain 1.9 g of compound 4 (light yellow solid). The synthesis pathway of the above reaction is described as following:

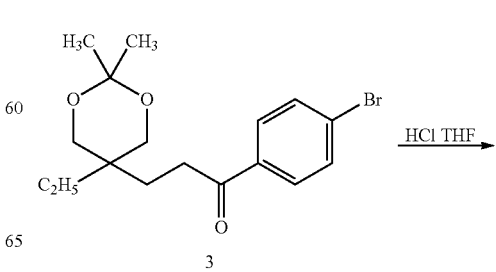

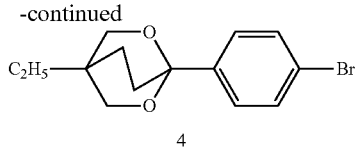

4

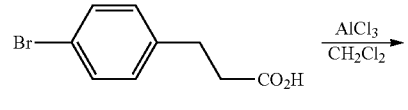

5

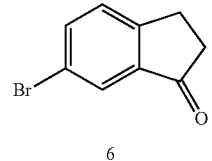

6

15 mL of THF, 0.3 g of the compound 4, 0.26 g of 3,4,5-trifluorophenylboronic acid, 3 mL of potassium carbonate aqueous solution (1N), and 0.05 g of Pd(PPh$_3$)$_4$ were added into a reaction bottle and was heated to reflux for 18 hours. Up the completion of reaction, 50 mL of water was added into the reaction bottle to quench the reaction. An organic layer was collected and dried by anhydrous sodium sulfate. After filtration and concentration, the resultant was purified by column chromatography with ethyl acetate and n-hexane (1:10) to obtain 0.3 g of liquid-crystal compound 2doPUF (white solid). The synthesis pathway of the above reaction is described as following:

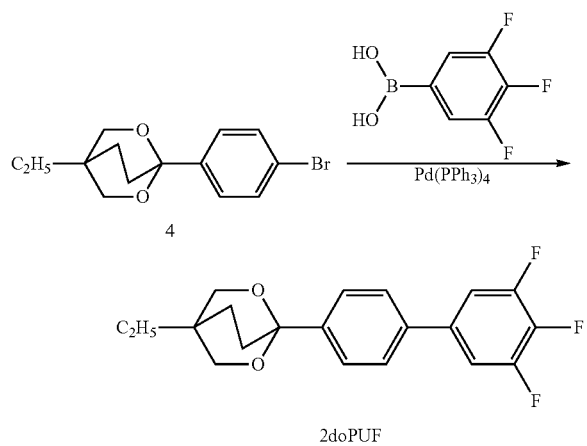

2doPUF

Preparation Example 4

Method for Preparing Liquid-Crystal Compound 3RIGUQUF

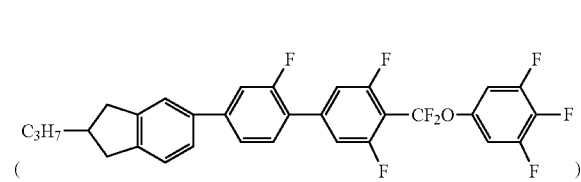

229 g of 4-bromophenylpropionic acid (compound 5) and 357 g of aluminum chloride (AlCl$_3$) were added into a 2 L three-necked bottle, and heated under reflux for 3 hours. Then, excessive AlCl$_3$ was removed, and 1.2 L of dichloromethane was added. Then, the temperature was lowered to 5° C., and 3,200 g of AlCl$_3$ was added. The reaction solution was refluxed for 5 hours, and poured into a mixture of HCl and ice for hydrolysis. The product was extraction and purified by flash chromatography to obtain 168.8 g of compound 6 (pale-yellow solid) with a yield of 80%. The synthesis pathway of the above reaction is described as following:

168.8 g of the compound 6 and 650 mL of ethanol were added into a reaction bottle. Next, the temperature was controlled below 10° C., and 45 g of NaBH$_4$ were added in small portions. Then, the temperature was warmed to room temperature, and the reaction solution was continuously stirred for 3 hours. After the completion of reaction, ethanol was removed, and 450 mL of 10% HCl was added for hydrolysis. The mixture was extracted with dichloromethane, then washed by water, and dried, and the solvent was removed, to obtain 170 g of compound 7 (pale-yellow solid) with a yield of 100%. The synthesis pathway of the above reaction is described as following:

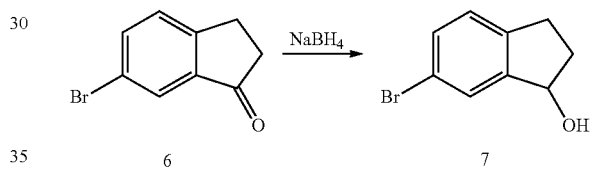

170 g of the compound 7, 1.2 L of benzene, and 8 g of p-toluenesulfonic acid were added into a reaction bottle, and refluxed for 3 hours. After reaction was complete, benzene was removed. Then, the crude product was purified by flash chromatography to obtain 148 g of compound 8 (pale-yellow oily substance) with a yield of 95%. The synthesis pathway of the above reaction is described as following:

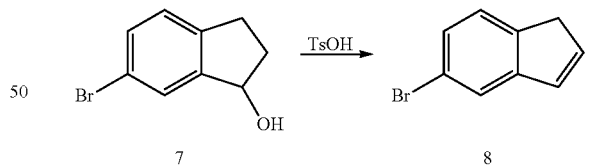

Next, 1.5 L of formic acid and 300 mL of 30% H$_2$O$_2$ were added into a reaction bottle, and the temperature was controlled between 35° C. and 40° C. in water bath. Then, 148 g of the compound 8 was added. The reaction was stirred for 12 h at room temperature. Then, the reaction was poured into a large amount of water, to precipitate a white solid, and filtered. Then, 3 L of 7% sulfuric acid solution was added into a 5 L three-necked bottle, and heated to boil. The above white solid was added into the reaction bottle subjected to distillation to obtain 64 g of compound 9 (white solid). The synthesis pathway of the above reaction is described as following:

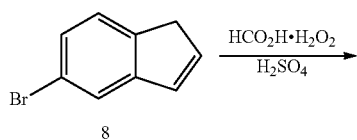

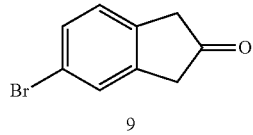

64 g of compound 9, 90 mL of ethanol, 600 mL of toluene, and 3 g of p-toluenesulfonic acid were added into a 1 L three-necked bottle, and heated to reflux for 3.5 hours. The reaction solution was allowed to cool down to room temperature and quenched. Then, toluene was removed, and the crude product was purified with silica gel to obtain 61 g of compound 10 (pale-yellow solid) with a yield of 80%.

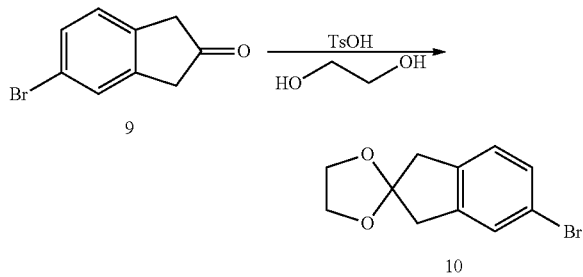

42 g of the compound 10, 23.1 g of 3-fluorophenylboronic acid, 70 g of sodium carbonate, 300 mL of water, 300 mL of ethanol, 600 mL of toluene, and 2 g of Pd(PPh$_3$)$_4$ were added into a 2 L three-necked bottle. The mixture was heated to reflux under nitrogen for 6 hours. Then, the obtained gray-black solid was purified by column chromatography, and then recrystallized to obtain 38 g of compound 11 (pale-yellow solid) with a yield of 85%. The synthesis pathway of the above reaction is described as following:

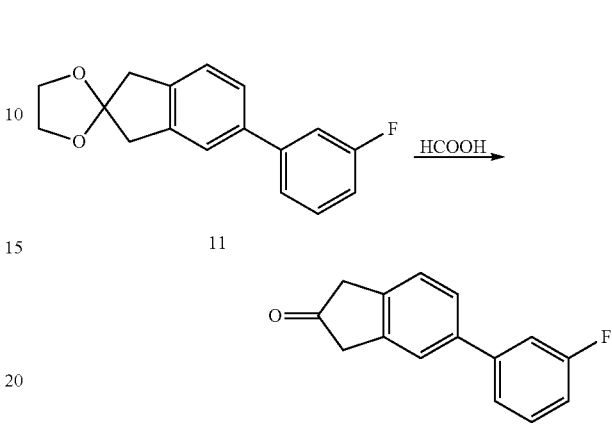

38 g of compound 11, 200 mL of 84% formic acid solution, and 150 mL of toluene were added into a 500 mL three-necked bottle. Then, the temperature was controlled at 20° C., and the mixture was stirred for 20 hours. After completion, the mixture was extracted with water and ethyl acetate. The organic layer was collected and concentrated to give a crude product, which was recrystallized with isopropanol to obtain 28 g of compound 12 (pale-yellow solid) with a yield of 88%. The synthesis pathway of the above reaction is described as following:

3.3 g of magnesium powder, 50 mL of anhydrous THF, a grain of iodine, and several drops of bromopropane were added into a 500 mL three-necked bottle. The reaction solution was heated mildly under nitrogen. After the reaction is triggered, a mixture of 18 g of bromopropane and 150 mL of anhydrous THF was added dropwisely. After addition, the reactant was refluxed for 1 hour. Then, the reaction temperature was lowered to −10° C., and a mixture of 28 g of the compound 12 and 150 mL of anhydrous THF was further added dropwisely. After addition, the temperature was controlled at −10° C., and the reactant was stirred for 12 hours. Then, the reactant was poured into a mixture of HCl and ice for hydrolysis, and was extracted two times with toluene for separation. Then, the extract was distilled to about 250 mL, into which 1 g of p-toluenesulfonic acid was added. Then, the solution was refluxed and dehydrated for 2 hours, to obtain a brownish red oily substance. The product was subjected to column chromatography, and recrystallized to obtain 10 g of compound 13 (pale-yellow solid) with a yield of 32%. The synthesis pathway of the above reaction is described as following:

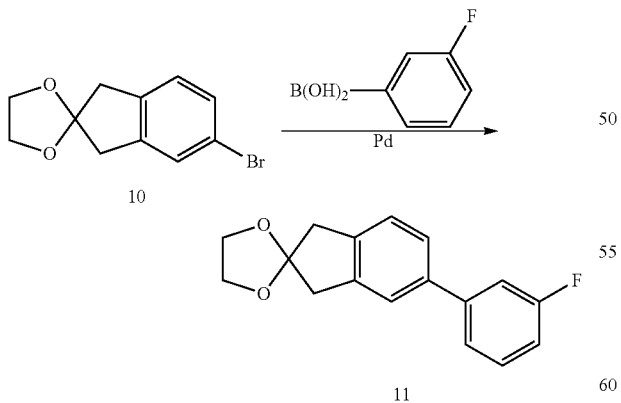

10 g of compound 13, 1 g of 5% Pd/C, 100 mL of ethanol and 100 mL of toluene were added into a 1 L hydrogen reactor, and the pressure of hydrogen was 1 atm. The hydrogen was supplied for 6 h at 25° C. to obtain 9.5 g of compound 14 (white solid) with a yield of 94%. The synthesis pathway of the above reaction is described as following:

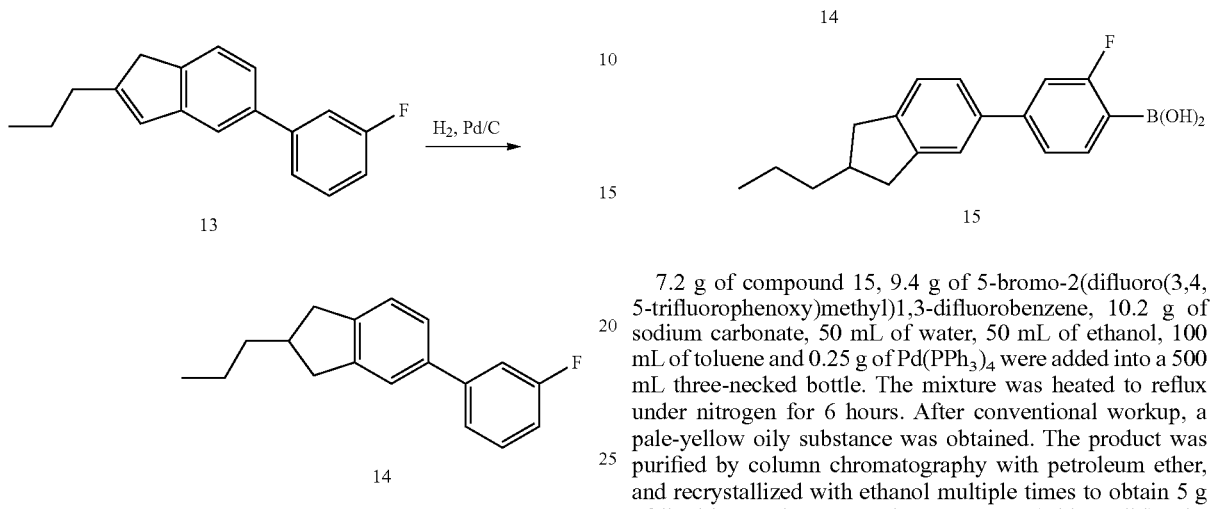

Next, 9.5 g of the compound 14, 4.2 g of t-BuOK, and 100 mL of anhydrous THF were added into a 250 mL three-necked bottle. Under nitrogen, the temperature was cooled to −100° C., and 17 mL of a solution of n-BuLi in hexane (2.4 mol/L) was added dropwisely. After completion of addition, the temperature was controlled at −100° C., and the reactant was stirred for 1 hour. Then, a mixture of 9.5 g of triisobutyl borate in 50 mL of anhydrous THF was added. After addition, the temperature was controlled at −100° C., and the reaction solution was stirred for 1 hour. Then, the temperature was warmed to room temperature and HCl (50 mL, 1N) was added for hydrolysis. Standard workup procedure was applied to obtain 7.2 g of compound 15 (yellow solid) with a yield of 65%. The synthesis pathway of the above reaction is described as following:

7.2 g of compound 15, 9.4 g of 5-bromo-2(difluoro(3,4,5-trifluorophenoxy)methyl)1,3-difluorobenzene, 10.2 g of sodium carbonate, 50 mL of water, 50 mL of ethanol, 100 mL of toluene and 0.25 g of Pd(PPh$_3$)$_4$ were added into a 500 mL three-necked bottle. The mixture was heated to reflux under nitrogen for 6 hours. After conventional workup, a pale-yellow oily substance was obtained. The product was purified by column chromatography with petroleum ether, and recrystallized with ethanol multiple times to obtain 5 g of liquid-crystal compound 3RIGUQUF (white solid). The synthesis pathway of the above reaction is described as following:

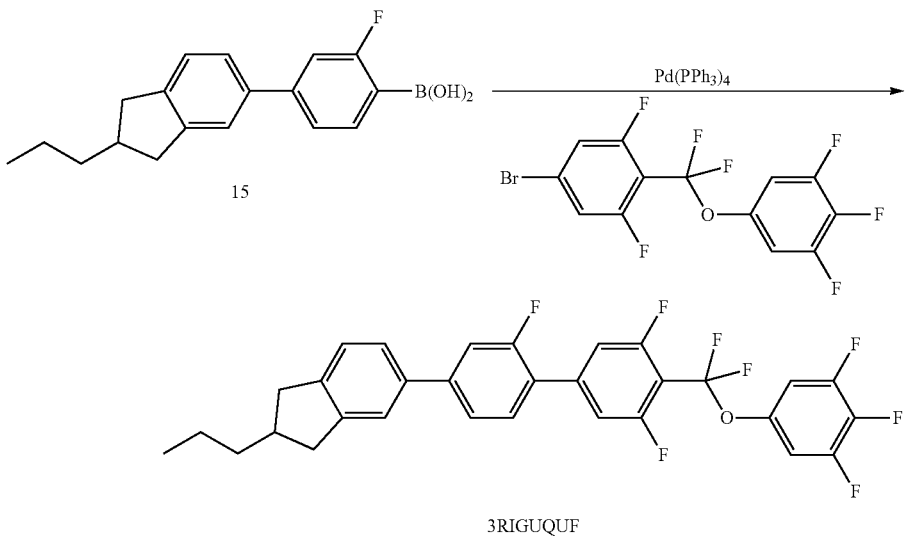

Preparation and Measurement of Liquid-Crystal Compositions

Examples 1-6 and Comparative Example 1

Example 1-6 and comparative example 1 are prepared by mixing liquid-crystal compounds of the invention, 2toPUO$_2$F, 3toPUO$_2$F, 2toUQUO$_2$F, 3toUQUO$_2$F, 2toPPO$_2$F, 2toPUQUO$_2$F, and comparative compound 2toPUF respectively with a mother liquid mixture A. The ratio of the liquid crystal compound and the mother liquid mixture A is illustrated in detail in Table 2. The mother liquid crystal mixture A consists of 2CCGF, 3CCGF, and 5CCGF in a weight ratio of 1:1:1. Physical properties (i.e., Δn, γ1, and Δε) of the mother liquid crystal mixture A were measured in advance. Since the physical properties (i.e., Δn, γ1, and Δε) of the mother liquid crystal mixture A are known, the physical properties (i.e., Δn, γ1, and Δε) of each liquid crystal compound were calculated from the value obtained by measurement, according to extrapolation methods.

Examples 1-6 and Comparative Example 1 were subjected to the following tests in order to measure characteristic values.

Test of Clearing Point ($T_{ni}$):

0.5 mg to 10 mg of a liquid-crystal composition (or a liquid-crystal compound) was precisely weighed and placed in an aluminum pan, and then analyzed using a differential scanning calorimeter (DSC). During heating or cooling the liquid-crystal composition (or the liquid-crystal compound) in the differential scanning calorimeter, phase transitions (from a nematic phase to a liquid phase) of the liquid-crystal composition (or the liquid-crystal compound) could be observed by endothermic peaks or exothermic peaks. The initiation of the phase transition was used to determine a phase transition temperature.

Test of Dielectric Anisotropy (Δε):

A liquid-crystal composition was fed into a vertical alignment liquid-crystal cell. The cell was applied with a voltage of 0 V to 20 V at 25° C. When the major-axis direction of the liquid-crystal molecule was parallel to a base of the vertical alignment liquid-crystal cell, a capacitance (C∥) was measured to thereby calculate a dielectric (ε∥) of the liquid-crystal compound. When the major-axis direction of the liquid-crystal molecule was perpendicular to the base of the vertical alignment liquid-crystal cell, a capacitance (C⊥) was measured to thereby calculate a dielectric (ε∥) of the liquid-crystal compound. A dielectric anisotropy (Δε) of a liquid-crystal compound was calculated according to the equation: Δε=ε∥−ε⊥. Furthermore, the dielectric anisotropy (Δε) of the liquid-crystal compound can be measured from the dielectric anisotropy (Δε) of the corresponding liquid-crystal composition via extrapolation.

Test of Refractive Index Anisotropy (Δn):

A surface of a main prism of Abbe refractometer (ATAGO Inc., DR-M2)) was rubbed in one direction, and then a liquid-crystal composition to be tested was dropped onto the rubbed surface of the main prism. A refractive index of the liquid-crystal compound was measured at 25° C. using polarized light having a wavelength of 589 nm, by means of an Abbe refractometer with a polarizing plate mounted on the ocular lens thereof. A refractive index (n∥) was determined when the direction of the polarized light was parallel to the rubbing direction. A refractive index (n⊥) was determined when the direction of polarized light was perpendicular to the rubbing direction. The refractive index anisotropy (Δn) of the liquid-crystal compound was calculated from the equation: Δn=n∥−n⊥. Furthermore, the refractive index anisotropy (Δn) of the liquid-crystal compound can be measured from the refractive index anisotropy (Δn) of the corresponding liquid-crystal composition via extrapolation.

Test of Rotational Viscosity (γ1)

The rotational viscosity (γ1) of the liquid-crystal composition was measured based on the dielectric anisotropy (Δε) thereof via an automatic liquid-crystal tester (INSTEC Inc). Furthermore, the rotational viscosity (γ1) of the liquid-crystal compound can be measured from the rotational viscosity (γ1) of the corresponding liquid-crystal composition via extrapolation.

TABLE 2

| | Example 1 | Example 2 | Example 3 | Example 4 | Example 5 | Example 6 | Comparative Example 1 |
|---|---|---|---|---|---|---|---|
| 2toPUO$_2$F | 2.5 | 0 | 0 | 0 | 0 | 0 | 0 |
| 3toPUO$_2$F | 0 | 2.5 | 0 | 0 | 0 | 0 | 0 |
| 2toUQUO$_2$F | 0 | 0 | 10 | 0 | 0 | 0 | 0 |
| 3toUQUO$_2$F | 0 | 0 | 0 | 3 | 0 | 0 | 0 |
| 2toPPO$_2$F | 0 | 0 | 0 | 0 | 3 | 0 | 0 |
| 2toPUQUO$_2$F | 0 | 0 | 0 | 0 | 0 | 3 | 0 |
| comparative compound 2toPUF | 0 | 0 | 0 | 0 | 0 | 0 | 2.5 |
| mother liquid crystal mixture A | 97.5 | 97.5 | 90 | 97 | 97 | 97 | 97.5 |
| $T_{ni}$ (° C.) | 111.4 | 112.37 | 100.82 | 108.63 | 112.6 | 111.09 | 109.52 |
| Δε | 6.62 | 6.615 | 8.93 | 7.08 | 6.29 | 7.32 | 6.645 |
| γ1 (mPa · s) | 155.35 | 152.45 | 114.55 | 154.25 | 153.9 | 158.75 | 159.1 |
| Δn | 0.081 | 0.082 | 0.081 | 0.079 | 0.082 | 0.082 | 0.081 |

TABLE 3

| | $T_{ni}$ (° C.) | Δε | γ1 (mPa · s) | Δn |
|---|---|---|---|---|
| 2toPUO$_2$F | 53 | 35.1 | 284 | 0.199 |
| 3toPUO$_2$F | 104 | 34.8 | 162 | 0.185 |
| 2toUQUO$_2$F | −4.1 | 36.7 | −222.5 | 0.092 |
| 3toUQUO$_2$F | 3.4 | 43.2 | 187.7 | 0.084 |
| 2toPPO$_2$F | 104 | 19.2 | 212 | 0.19 |
| 2toPUQUO$_2$F | 78.1 | 49.8 | 320.9 | 0.163 |
| comparative compound 2toPUF | −23.1 | 36.2 | 433.5 | 0.161 |

As shown in Tables 3, the liquid-crystal compounds of the Formula (I) of the invention have the general physical properties necessary for the liquid crystal compositions, namely, high dielectric anisotropies (19.2-49.8), low rotational viscosities, and suitable optical anisotropies that can satisfy the requirements of modern liquid-crystal devices. Moreover, in comparison with the comparative liquid crystal compound, the liquid crystal compound of the invention would have more attractive characteristics in terms of higher $T_{ni}$ and lower γ1.

Example 7-18

The liquid-crystal compositions of Examples 7-18 are disclosed in Table 4.

TABLE 4

| | Example 7 | Example 8 | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| 2toUQUO$_2$F | 0 | 2 | 2.5 | 9 | 6 | 9 | 2.5 | 5.7 | 0 | 6.5 | 5.3 | 4.5 |
| 3toUQUO$_2$F | 4.5 | 0 | 0 | 0 | 0 | 0 | 0 | 0 | 5 | 0 | 0 | 0 |
| 2toPUQUO$_2$F | 4.5 | 0 | 0 | 0 | 0 | 0 | 0 | 0 | 0 | 0 | 0 | 0 |
| 3RIUQUOCF$_3$ | 0 | 0 | 2 | 2 | 4 | 2 | 2 | 2 | 5.5 | 2 | 0 | 0 |
| 2RIGUO$_2$F | 0 | 0 | 0 | 0 | 0 | 0 | 0 | 0 | 0 | 3 | 0 | 0 |
| 3RIPUO$_2$F | 0 | 0 | 0 | 0 | 0 | 0 | 0 | 0 | 6.2 | 0 | 0 | 0 |
| 2RIGUQUO$_2$F | 0 | 6 | 0 | 0 | 0 | 0 | 0 | 0 | 0 | 0 | 0 | 0 |
| RIGUQUF | 0 | 3.5 | 4 | 0 | 0 | 0 | 4 | 2 | 0 | 5 | 4.1 | 3.5 |
| 1RIGUQUF | 0 | 7 | 3 | 0 | 0 | 0 | 3 | 2 | 5 | 4 | 2.9 | 2.5 |
| 2RIGUQUF | 0 | 5 | 4 | 4 | 5 | 4 | 3 | 3 | 1 | 0 | 4.5 | 3.5 |
| 3RIGUQUF | 0 | 5.5 | 5 | 4 | 5 | 4 | 4 | 4 | 6 | 6 | 3.5 | 3 |
| 2doPUO$_2$F | 0 | 0 | 0 | 0 | 0 | 0 | 0 | 0 | 0 | 0 | 3 | 2.6 |
| 3doPUO$_2$F | 0 | 0 | 0 | 0 | 0 | 0 | 0 | 0 | 0 | 0 | 5.9 | 5 |
| 3CCPGF | 0 | 6.1 | 4.5 | 4.5 | 3 | 3 | 4.5 | 3.7 | 6 | 5 | 0 | 0 |
| 3CCV | 34.1 | 52.9 | 34 | 36 | 40 | 39 | 34 | 36.5 | 44 | 50.2 | 48.4 | 41 |
| 3CCV1 | 0 | 0 | 5 | 5 | 5 | 6 | 5 | 7.5 | 6 | 0 | 0 | 0 |
| 3CC5 | 0 | 0 | 4 | 4 | 0 | 0 | 4 | 0 | 0 | 0 | 0 | 0 |
| 3CPN | 0 | 0 | 9 | 5 | 6 | 5 | 9 | 7 | 0 | 0 | 0 | 0 |
| 3CPTP2 | 6 | 0 | 2 | 6.5 | 6 | 8 | 2 | 5 | 2.3 | 4 | 8.7 | 0 |
| 3CPTPO2 | 0 | 0 | 0 | 0 | 0 | 0 | 0 | 0 | 0 | 2.3 | 0 | 0 |
| VCCGF | 0 | 0 | 5 | 3 | 0 | 3 | 5 | 5.5 | 0 | 0 | 0 | 0 |
| 3CCPF | 0 | 0 | 0 | 2 | 3.5 | 1.5 | 2 | 0 | 0 | 4 | 0 | 2.5 |
| 3CPPF | 9 | 0 | 5 | 5 | 5.5 | 5.5 | 5 | 5.4 | 0 | 0 | 0 | 7.4 |
| 2CPGF | 0 | 0 | 0 | 0 | 0 | 0 | 0 | 0 | 0 | 0 | 0 | 2.3 |
| 3CPGF | 0 | 0 | 3 | 0 | 0 | 0 | 3 | 0 | 0 | 0 | 0 | 2.3 |
| 3CUQUF | 10 | 0 | 0 | 0 | 0 | 0 | 0 | 0 | 0 | 0 | 0 | 0 |
| 3CCPOCF$_3$ | 16 | 12 | 8 | 10 | 11 | 10 | 8 | 10.7 | 12 | 8 | 0 | 12.9 |
| V2PTP2V | 0 | 0 | 0 | 0 | 0 | 0 | 0 | 0 | 1 | 0 | 10.2 | 4 |
| 1PTPO2 | 7 | 0 | 0 | 0 | 0 | 0 | 0 | 0 | 0 | 0 | 3.5 | 3 |
| 3PTPO1 | 8.9 | 0 | 0 | 0 | 0 | 0 | 0 | 0 | 0 | 0 | 0 | 0 |

Next, the liquid-crystal compositions of Examples 7-18 were subjected to the tests, and the properties (such as clearing point ($T_{ni}$), dielectric anisotropy ($\Delta\epsilon$), rotational viscosity ($\gamma 1$), and refractive index anisotropy ($\Delta n$)) of the liquid-crystal compositions are shown in Table 5.

TABLE 5

| | Example 7 | Example 8 | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| $T_{ni}$ (° C.) | 74.17 | 79 | 78 | 81 | 79 | 79 | 79 | 79 | 80 | 78 | 62 | 72 |
| $\Delta\epsilon$ | 5.94 | 7.7 | 7.8 | 7.6 | 7.2 | 7.3 | 7.4 | 7.4 | 7.1 | 7.6 | 7.0 | 7.5 |
| $\gamma 1$ (mPa·s) | 52.76 | 61 | 63 | 58 | 56 | 54 | 59 | 57 | 58 | 59 | 48 | 54 |
| $\Delta n$ | 0.1237 | 0.098 | 0.102 | 0.098 | 0.099 | 0.099 | 0.100 | 0.099 | 0.101 | 0.101 | 0.123 | 0.109 |

Examples 19-27 and Comparative Examples 2-3

The liquid-crystal compounds were mixed to prepare the liquid-crystal compositions of Examples 19-27 and Comparative Examples 2-3 according to Table 6.

TABLE 6

| | Example 19 | Example 20 | Example 21 | Example 22 | Example 23 | Example 24 | Example 25 | Example 26 | Example 27 | Comparative Example 2 | Comparative Example 3 |
|---|---|---|---|---|---|---|---|---|---|---|---|
| 2toUQUO$_2$F | 4 | 9.5 | 2 | 2 | 3 | 5.3 | 2 | 1.5 | 2 | 0 | 23.5 |
| 2toUQUO1CF$_3$ | 0 | 0 | 0 | 0 | 0.5 | 0 | 0 | 0 | 0 | 0 | 0 |
| 3RIUQUOCF$_3$ | 0 | 0 | 0 | 0 | 3 | 3 | 0 | 0 | 0 | 7 | 0 |
| 3RIPUO$_2$F | 0 | 0 | 0 | 0 | 0 | 5.5 | 0 | 0 | 0 | 0 | 0 |
| RIGUQUF | 4.5 | 5.9 | 7.8 | 0 | 3 | 0 | 0 | 0 | 0 | 0 | 0 |
| 1RIGUQUF | 4.5 | 4.3 | 7.8 | 0 | 0 | 5 | 0 | 0 | 0 | 0 | 0 |
| 2RIGUQUF | 4 | 0 | 3 | 0 | 5 | 0 | 0 | 0 | 0 | 6 | 0 |

TABLE 6-continued

| | Example 19 | Example 20 | Example 21 | Example 22 | Example 23 | Example 24 | Example 25 | Example 26 | Example 27 | Comparative Example 2 | Comparative Example 3 |
|---|---|---|---|---|---|---|---|---|---|---|---|
| 3RIGUQUF | 4 | 0 | 0 | 0 | 1.5 | 7 | 0 | 0 | 0 | 6 | 0 |
| 2doPUF | 0 | 0 | 0 | 6.8 | 0 | 0 | 7.9 | 6.8 | 6.8 | 0 | 0 |
| 2doPUO$_2$F | 0 | 0 | 0 | 4.6 | 0 | 0 | 0 | 0 | 0 | 0 | 0 |
| 3doPUO$_2$F | 0 | 0 | 0 | 7.2 | 0 | 0 | 7.9 | 0 | 7.7 | 0 | 0 |
| 5doPUO$_2$F | 0 | 0 | 0 | 0 | 0 | 2 | 0 | 0 | 0 | 0 | 0 |
| 3CCPGF | 0 | 0 | 0 | 0 | 3 | 7.2 | 0 | 0 | 0 | 4.5 | 0 |
| 3CCV | 43 | 37.8 | 40.3 | 38.1 | 41 | 45.5 | 40.2 | 38.1 | 38.1 | 36 | 36 |
| 3CCV1 | 2.1 | 0 | 0 | 0 | 0 | 0 | 0 | 0 | 0 | 5 | 5 |
| 3CC4 | 0 | 10 | 0 | 0 | 0 | 0 | 0 | 0 | 0 | 0 | 0 |
| 3CC5 | 0 | 9.5 | 1.4 | 1 | 0 | 0 | 1.4 | 2.9 | 1 | 4 | 4 |
| 3CPN | 0 | 0 | 0 | 0 | 0 | 3 | 0 | 0 | 0 | 5 | 5 |
| 3CPTP2 | 4 | 8.5 | 0 | 0 | 0 | 5 | 0 | 0 | 0 | 6.5 | 6.5 |
| 3CPTP4 | 3.4 | 0 | 2.9 | 0 | 0 | 0 | 0 | 0 | 0 | 0 | 0 |
| 3CPTPO2 | 0 | 0 | 0 | 2.9 | 0 | 0 | 2.9 | 2.9 | 2.9 | 0 | 0 |
| VCCGF | 0 | 0 | 0 | 0 | 0 | 0 | 0 | 0 | 0 | 3 | 3 |
| 3CCPF | 0 | 0 | 0 | 0 | 4 | 0 | 0 | 0 | 0 | 2 | 2 |
| 3CPPF | 0 | 4 | 0 | 0 | 0 | 0 | 0 | 0 | 0 | 5 | 5 |
| 3CPP2 | 0 | 4.5 | 0 | 0 | 0 | 0 | 0 | 0 | 0 | 0 | 0 |
| 3CPGF | 2.5 | 0 | 0 | 0 | 3 | 0 | 0 | 0 | 0 | 0 | 0 |
| 3CPUF | 0 | 0 | 0 | 0 | 9 | 0 | 0 | 0 | 0 | 0 | 0 |
| 3CCPOCF$_3$ | 12.4 | 6 | 19.6 | 19.3 | 12 | 9 | 19.6 | 19.1 | 19.1 | 10 | 10 |
| 3CCGOCF$_3$ | 0 | 0 | 0 | 0 | 6.5 | 0 | 0 | 0 | 0 | 0 | 0 |
| 5PP1 | 0 | 0 | 1.4 | 2.9 | 0 | 0 | 1.4 | 0 | 2.9 | 0 | 0 |
| 3PPV | 0 | 0 | 0 | 0 | 0 | 2.5 | 0 | 0 | 0 | 0 | 0 |
| 3PGUF | 0 | 0 | 0 | 0 | 4 | 0 | 0 | 0 | 0 | 0 | 0 |
| V2PTP2V | 11.6 | 0 | 7 | 6.9 | 0 | 0 | 7 | 6.8 | 6.8 | 0 | 0 |
| 1PTPO2 | 0 | 0 | 6.8 | 0 | 0 | 0 | 7 | 0 | 0 | 0 | 0 |
| 3PTPO1 | 0 | 0 | 0 | 8.3 | 0 | 0 | 0 | 0 | 0 | 0 | 0 |
| 3PTPO2 | 0 | 0 | 0 | 0 | 0 | 0 | 0 | 9.8 | 8.2 | 0 | 0 |
| 2toPPO$_2$F | 0 | 0 | 0 | 0 | 0.5 | 0 | 0 | 0 | 0 | 0 | 0 |
| 2toPUO$_2$F | 0 | 0 | 0 | 0 | 0.5 | 0 | 0 | 0 | 0 | 0 | 0 |
| 3toPUO$_2$F | 0 | 0 | 0 | 0 | 0.5 | 0 | 0 | 0 | 0 | 0 | 0 |
| 2doPUQUF | 0 | 0 | 0 | 0 | 0 | 0 | 2.7 | 4.5 | 4.5 | 0 | 0 |
| 3doPUQUF | 0 | 0 | 0 | 0 | 0 | 0 | 0 | 7.6 | 0 | 0 | 0 |

Next, the liquid-crystal compositions of Examples 19-27 and Comparative Examples 2-3 were subjected to the tests, and the properties (such as clearing point (Tni), dielectric anisotropy (Δε), rotational viscosity (γ1), and refractive index anisotropy (Δn)) of the liquid-crystal compositions are shown in Table 7. the liquid-crystal compositions of Comparative Example 3 do not employ the liquid-crystal compound of Formula (II), the liquid-crystal compositions of Comparative Example 3 do not exist in nematic phase at room temperature and the properties of the liquid crystal cannot be measured. The liquid-crystal compositions of Examples 7-27 have high

TABLE 7

| | Example 19 | Example 20 | Example 21 | Example 22 | Example 23 | Example 24 | Example 25 | Example 26 | Example 27 | Comparative Example 2 | Comparative Example 3 |
|---|---|---|---|---|---|---|---|---|---|---|---|
| Tni (° C.) | 72 | 74 | 71 | 70 | 75 | 79 | 73 | 70 | 70 | 87 | separated |
| Δε | 6.0 | 5.9 | 6.1 | 6.0 | 7.8 | 7.5 | 5.8 | 5.8 | 6.0 | 6.3 | out at |
| γ1 (mPa·s) | 49 | 48 | 50.7 | 51 | 57 | 61 | 50 | 50 | 51 | 64 | room |
| Δn | 0.119 | 0.094 | 0.121 | 0.117 | 0.094 | 0.108 | 0.113 | 0.120 | 0.117 | 0.105 | temperature |

As shown in Table 5 and 7, the compositions of Examples 7-27 of the invention, including the liquid crystal compounds of both Formula (I) and Formula (II), exhibit low rotational viscosity and high dielectric anisotropy. Therefore, the liquid-crystal device employing the liquid-crystal composition of the disclosure would have high response time and low threshold voltage. On the other hand, since the liquid-crystal compositions including the liquid-crystal compounds of both Formula (I) and Formula (II) exhibits a broad nematic phase range, the liquid-crystal device employing the liquid-crystal compositions of the disclosure could have a broad operating temperature range. Since the liquid-crystal compositions of Comparative Example 2 do not employ the liquid-crystal compound of Formula (I), the liquid-crystal compositions of Comparative Example 2 have high rotational viscosity and low dielectric anisotropy. Since dielectric anisotropies (between about 19.2-49.8) that satisfy the requirements of liquid-crystal devices. Therefore, it can be foreseen that a liquid-crystal device employing the liquid-crystal compounds of both Formula (I) and Formula (II) would have a characteristic of low power consumption.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid-crystal compound of Formula (I):

Formula (I)

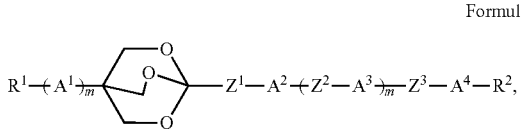

wherein $R^1$ is hydrogen, $C_{1-10}$ alkyl, or $C_{2-10}$ alkenyl; $R^2$ is $C_{2-10}$ alkenyl, or $C_{2-10}$ fluoroalkenyl, in which one or two nonadjacent —CH$_2$— is replaced by —O—, or $C_{2-10}$ ether; $A^1$, $A^2$, $A^3$, and $A^4$ are independently

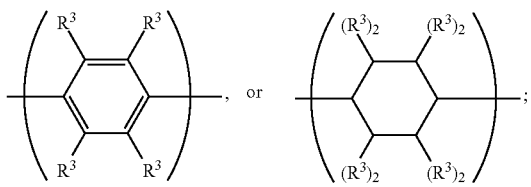

$R^3$ is independently hydrogen, or halogen; $Z^1$, $Z^2$, and $Z^3$ are independently single bond, —CH$_2$—, —(CH$_2$)$_2$—, —(CH$_2$)$_4$—, —CH$_2$O—, —OCH$_2$—, —CF=CF—, —(CH$_2$)$_2$CF$_2$O—, —(CH$_2$)$_2$OCF$_2$—, —OCF$_2$(CH$_2$)$_2$—, —CF$_2$O(CH$_2$)$_2$—, —COO—, —OCO—, —CF$_2$O—, —OCF$_2$—, —C≡C—, —CH=CH—, —CH=CH—(CH$_2$)$_2$—, or —(CH$_2$)$_2$—CH=CH—; and n and m are independently 1 or 0.

2. The liquid-crystal compound according to claim 1, wherein $R^2$ is —OCHCF$_2$, or —OCF$_2$CFCF$_2$.

3. The liquid-crystal compound according to claim 1, wherein $A^1$, $A^2$, $A^3$, and $A^4$ are independently

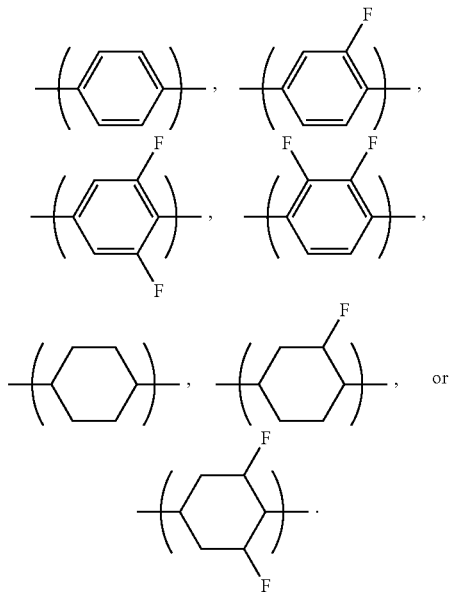

4. The liquid-crystal compound according to claim 1, wherein $Z^1$, $Z^2$, and $Z^3$ are independently single bond, —C$_2$H$_4$—, —COO—, —OCO—, —CF$_2$O—, —OCF$_2$—, —C≡C—, or —CH=CH—.

5. The liquid-crystal compound according to claim 1, wherein the liquid-crystal compound of Formula (I) is

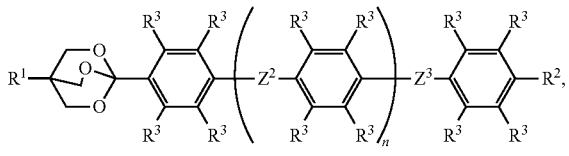

wherein $R^1$ is hydrogen, $C_{1-10}$ alkyl, or $C_{2-10}$ alkenyl; $R^2$ is —OCHCF$_2$, or —OCF$_2$CFCF$_2$; $R^3$ is independently hydrogen, or halogen; $Z^2$ and $Z^3$ are independently single bond, —CH$_2$—, —(CH$_2$)$_2$—, —(CH$_2$)$_4$—, —CH$_2$O—, —OCH$_2$—, —CF=CF—, —(CH$_2$)$_2$CF$_2$O—, —(CH$_2$)$_2$OCF$_2$—, —OCF$_2$(CH$_2$)$_2$—, —CF$_2$O(CH$_2$)$_2$—, —COO—, —OCO—, —CF$_2$O—, —OCF$_2$—, —C≡C—, —CH=CH—, —CH=CH—(CH$_2$)$_2$—, or —(CH$_2$)$_2$—CH=CH—; and n is 1 or 0.

6. The liquid-crystal compound according to claim 1, wherein the liquid-crystal compound of Formula (I) is

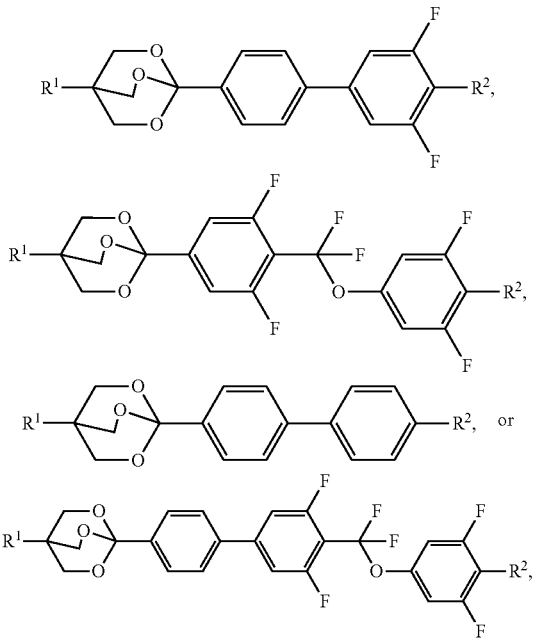

wherein $R^1$ is hydrogen, $C_{1-10}$ alkyl or $C_{2-10}$ alkenyl; and $R^2$ is —OCHCF$_2$ or —OCF$_2$CFCF$_2$.

7. A liquid-crystal composition, comprising:
at least one of the liquid-crystal compounds of Formula (I) according to claim 1; and
at least one of a liquid-crystal compound of Formula (II)

Formula (II)

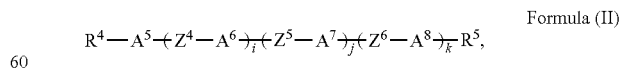

wherein $R^4$ is hydrogen, $C_{1-10}$ alkyl, or $C_{2-10}$ alkenyl; $R^5$ is hydrogen, halogen, cyano group, $C_{1-10}$ alkyl, $C_{2-10}$ alkenyl, $C_{1-10}$ fluoroalkyl, $C_{2-10}$ fluoroalkenyl, or above groups in which arbitrary —CH$_2$— is replaced by —O—, and plural —CH$_2$— adjacent to each other are not replaced simultaneously; $A^5$, $A^6$, $A^7$, and $A^8$ are independently

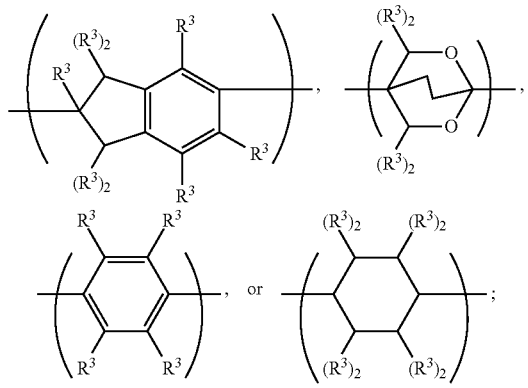

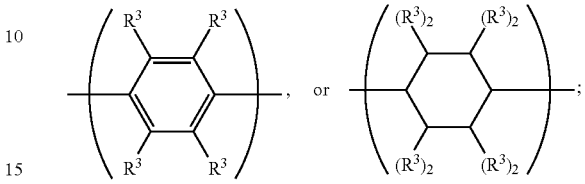

$R^3$ is independently hydrogen, or halogen; $Z^4$, $Z^5$, and $Z^6$ are independently single bond, —CH$_2$—, —(CH$_2$)$_2$—, —(CH$_2$)$_4$—, —CH$_2$O—, —OCH$_2$—, —CF=CF—, —(CH$_2$)$_2$CF$_2$O—, —(CH$_2$)$_2$OCF$_2$—, —OCF$_2$(CH$_2$)$_2$—, —CF$_2$O(CH$_2$)$_2$—, —COO—, —OCO—, —CF$_2$O—, —OCF$_2$—, —C≡C—, —CH=CH—, —CH=CH—(CH$_2$)$_2$—, or —(CH$_2$)$_2$—CH=CH—; and i, j, and k are independently 1 or 0.

8. The liquid-crystal composition according to claim 7, wherein the liquid-crystal compound of Formula (II) is

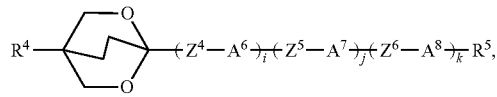

wherein $R^4$ is hydrogen, C$_{1-10}$ alkyl, or C$_{2-10}$ alkenyl; $R^5$ is hydrogen, halogen, cyano group, C$_{1-10}$ alkyl, C$_{2-10}$ alkenyl, C$_{1-10}$ fluoroalkyl, C$_{2-10}$ fluoroalkenyl, or above groups in which arbitrary —CH$_2$— is replaced by —O—, and plural —CH$_2$— adjacent to each other are not replaced simultaneously; $A^6$, $A^7$, and $A^8$ are independently

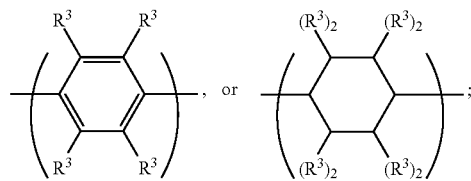

$R^3$ is independently hydrogen, or halogen; $Z^4$, $Z^5$, and $Z^6$ are independently single bond, —CH$_2$—, —(CH$_2$)$_2$—, —(CH$_2$)$_4$—, —CH$_2$O—, —OCH$_2$—, —CF=CF—, —(CH$_2$)$_2$CF$_2$O—, —(CH$_2$)$_2$OCF$_2$—, —OCF$_2$(CH$_2$)$_2$—, —CF$_2$O(CH$_2$)$_2$—, —COO—, —OCO—, —CF$_2$O—, —OCF$_2$—, —C≡C—, —CH=CH—, —CH=CH—(CH$_2$)$_2$—, or —(CH$_2$)$_2$—CH=CH—; and i, j, and k are independently 1 or 0.

9. The liquid-crystal composition according to claim 7, wherein the liquid-crystal compound of Formula (II) is

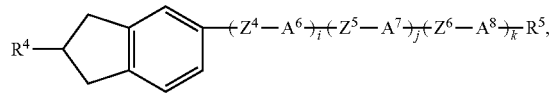

$R^4$ is hydrogen, C$_{1-10}$ alkyl, or C$_{2-10}$ alkenyl; $R^5$ is hydrogen, halogen, cyano group, C$_{1-10}$ alkyl, C$_{2-10}$ alkenyl, C$_{1-10}$ fluoroalkyl, C$_{2-10}$ fluoroalkenyl, or above groups in which arbitrary —CH$_2$— is replaced by —O—, and plural —CH$_2$— adjacent to each other are not replaced simultaneously; $A^6$, $A^7$, and $A^8$ are independently

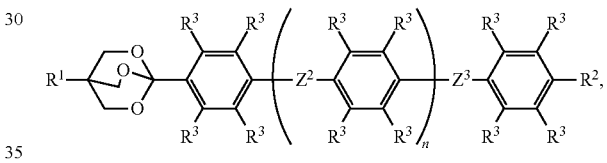

$R^3$ is independently hydrogen, or halogen; $Z^4$, $Z^5$, and $Z^6$ are independently single bond, —CH$_2$—, —(CH$_2$)$_2$—, —(CH$_2$)$_4$—, —CH$_2$O—, —OCH$_2$—, —CF=CF—, —(CH$_2$)$_2$CF$_2$O—, —(CH$_2$)$_2$OCF$_2$—, —OCF$_2$(CH$_2$)$_2$—, —CF$_2$O(CH$_2$)$_2$—, —COO—, —OCO—, —CF$_2$O—, —OCF$_2$—, —C≡C—, —CH=CH—, —CH=CH—(CH$_2$)$_2$—, or —(CH$_2$)$_2$—CH=CH—; and i, j, and k are independently 1 or 0.

10. The liquid-crystal composition according to claim 7, wherein the liquid-crystal compound of Formula (I) is wherein $R^1$ is hydrogen, C$_{1-10}$ alkyl, or C$_{2-10}$ alkenyl; $R^2$ is C$_{2-10}$ alkenyl, or C$_{2-10}$ fluoroalkenyl, in which one or two nonadjacent —CH$_2$— is replaced by —O—, or C$_{2-10}$ ether; $R^3$ is independently hydrogen, or halogen; $Z^2$ and $Z^3$ are independently single bond, —CH$_2$—, —(CH$_2$)$_2$—, —(CH$_2$)$_4$—, —CH$_2$O—, —OCH$_2$—, —CF=CF—, —(CH$_2$)$_2$CF$_2$O—, —(CH$_2$)$_2$OCF$_2$—, —OCF$_2$(CH$_2$)$_2$—, —CF$_2$O(CH$_2$)$_2$—, —COO—, —OCO—, —CF$_2$O—, —OCF$_2$—, —C≡C—, —CH=CH—, —CH=CH—(CH$_2$)$_2$—, or —(CH$_2$)$_2$—CH=CH—; and n is 0 or 1, and wherein at least one of $A^5$, $A^6$, $A^7$, and $A^8$ of the liquid-crystal compound of Formula (II) is

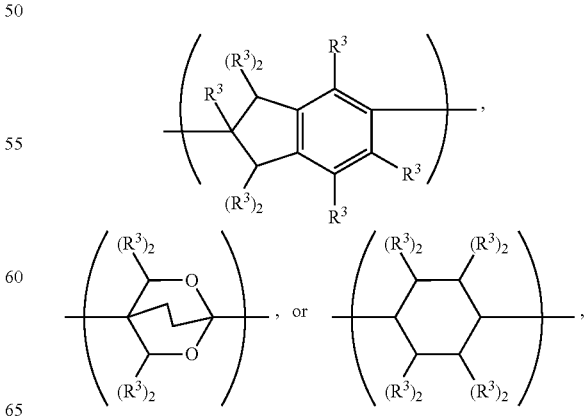

11. The liquid-crystal composition according to claim 7, wherein the liquid-crystal compound of Formula (I) is

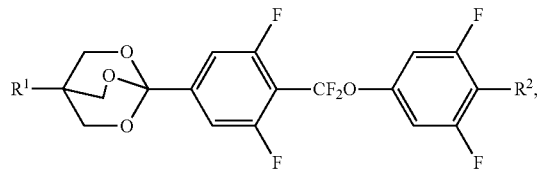

wherein $R^1$ is hydrogen, $C_{1-10}$ alkyl, or $C_{2-10}$ alkenyl; and, $R^2$ is —OCHCF$_2$, or —OCF$_2$CFCF$_2$, and wherein the liquid-crystal compound of Formula (II) is

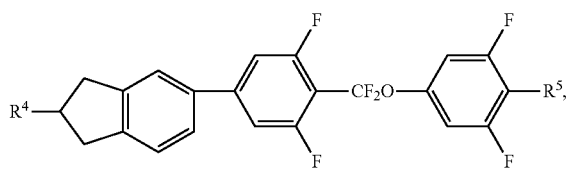

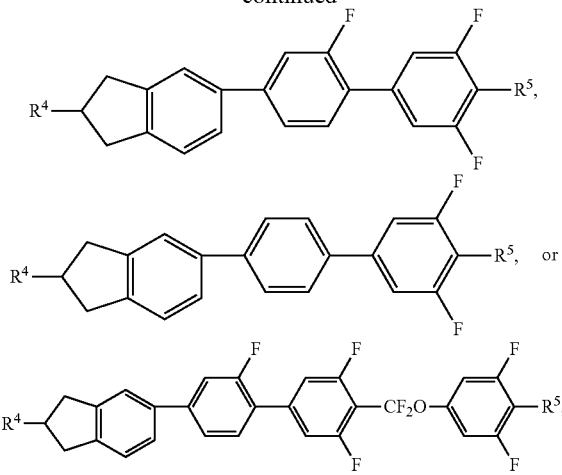

wherein $R^4$ is hydrogen, $C_{1-10}$ alkyl, or $C_{2-10}$ alkenyl; $R^5$ is hydrogen, fluorine, —OCF$_3$, —CF$_3$, —OCH=CF$_2$, or —OCH$_2$—CF$_3$.

12. A liquid-crystal device, comprising:
the liquid-crystal composition according to claim 7.

* * * * *